US008537314B2

(12) United States Patent
Lee et al.

(10) Patent No.: US 8,537,314 B2
(45) Date of Patent: Sep. 17, 2013

(54) DISPLAY DEVICE AND MANUFACTURING METHOD THEREOF

(75) Inventors: Jun-woo Lee, Anyang-si (KR);
Hwa-sung Woo, Suwon-si (KR);
Baek-kyun Jeon, Yongin-si (KR);
Kyoung-tae Kim, Cheonan-si (KR);
In-suk Lee, Suwon-si (KR)

(73) Assignee: Samsung Display Co., Ltd. (KR)

( * ) Notice: Subject to any disclaimer, the term of this patent is extended or adjusted under 35 U.S.C. 154(b) by 707 days.

(21) Appl. No.: 12/136,802

(22) Filed: Jun. 11, 2008

(65) Prior Publication Data

US 2009/0002618 A1 Jan. 1, 2009

(30) Foreign Application Priority Data

Jun. 27, 2007 (KR) ........................ 10-2007-0063820

(51) Int. Cl.
*G02F 1/1337* (2006.01)
*G02F 1/1343* (2006.01)

(52) U.S. Cl.
USPC ............ 349/129; 349/130; 349/139; 349/144

(58) Field of Classification Search
USPC ........................................ 349/129, 130, 144
See application file for complete search history.

(56) References Cited

U.S. PATENT DOCUMENTS

| 6,335,776 | B1 * | 1/2002 | Kim et al. ...................... 349/129 |
| 2006/0146243 | A1 * | 7/2006 | Nakanishi et al. ............. 349/139 |
| 2007/0019144 | A1 * | 1/2007 | Nakanishi et al. ............. 349/139 |
| 2007/0152221 | A1 * | 7/2007 | Sasabayashi et al. ........... 257/59 |
| 2008/0297708 | A1 * | 12/2008 | Yang et al. ..................... 349/136 |
| 2009/0284703 | A1 * | 11/2009 | Shoraku et al. ................ 349/129 |

FOREIGN PATENT DOCUMENTS

| JP | 2001281669 | 10/2001 |
| JP | 2006184516 | 7/2006 |
| JP | 2006330201 | 12/2006 |
| WO | 2006132369 | 12/2006 |
| WO | WO 2006132369 A1 * | 12/2006 |

* cited by examiner

*Primary Examiner* — Edward Glick
*Assistant Examiner* — Dennis Y Kim
(74) *Attorney, Agent, or Firm* — Cantor Colburn LLP

(57) ABSTRACT

A display device includes a first panel having a pixel electrode, a second panel having a common electrode facing the first panel, a liquid crystal layer interposed between the first panel and the second panel and having vertically-aligned liquid crystal molecules, a first alignment layer disposed on the pixel electrode, and a second alignment layer disposed on the common electrode. At least one of the first alignment layer and the second alignment layer divides the pixel electrode into a plurality of domains and is formed to have a plurality of pretilt directions which pretilt the vertically-aligned liquid crystal molecules in a domain of the plurality of domains. A sum of horizontal component directions of a pretilt direction of the plurality of pretilt directions is substantially equivalent to a sum of horizontal component directions of a fringe field at a peripheral boundary of the pixel electrode in the domain.

24 Claims, 9 Drawing Sheets

DISPLAY DEVICE AND MANUFACTURING METHOD THEREOF

This application claims priority to Korean Patent Application No. 10-2007-0063820, filed on Jun. 27, 2007, and all the benefits accruing therefrom under 35 U.S.C. §119, the contents of which in its entirety are herein incorporated by reference.

BACKGROUND OF THE INVENTION

1. Field of the Invention

The present invention relates to a display device and a manufacturing method thereof, and more particularly, to a display device having an improved viewing angle, an improved display property and increased manufacturing efficiency, and a manufacturing method thereof.

2. Description of the Related Art

Due to recent progress in semiconductor technologies, a liquid crystal display ("LCD") device provides improved performance compared to other types of display devices.

Further, the LCD device is small and light, and consumes less power than a cathode ray tube ("CRT"), and thus is often used in place of a CRT. The LCD device is also used in many information processing devices requiring a display means, such as small devices, e.g., mobile phones and personal digital assistants ("PDAs"), as well as medium- and large-size devices such as monitors and televisions, for example.

However, the LCD device has a relatively narrow viewing angle. To overcome the relatively narrow viewing angle and improve display property over a wide viewing angle, a vertically-aligned ("VA") mode LCD device is used, in which a single pixel is divided into a plurality of domains. In the VA mode LCD, a long axis of a liquid crystal molecule is vertically aligned with respect to an upper substrate and a lower substrate when an electric field is not present between the upper substrate and the lower substrate. Further, the pixel is the smallest unit of displaying an image.

The VA mode liquid crystal display device uses various methods to induce liquid crystal molecules in respective domains to have different pretilt directions. For example, in a patterned vertically aligned ("PVA") mode LCD, pretilt directions of the liquid crystal molecules are induced by a fringe field formed by a cutting pattern in a common electrode and a pixel electrode.

In the PVA mode LCD as well as in VA LCDs using other modes of operation, an additional manufacturing process is required to form the cutting pattern. As a result, a production efficiency of the LCD device is reduced.

Further, in the conventional VA mode LCD device, liquid crystal molecules induced in different pretilt directions in respective domains interfere and collide with each other, or an unintended force affects the liquid crystal molecules, thereby creating a domain in which the pretilt directions of the liquid crystal molecules are not controlled. As a result, light transmittance is lowered and brightness of the display device thereby decreases.

BRIEF SUMMARY OF THE INVENTION

Accordingly, an exemplary embodiment of the present invention provides a display device having an improved viewing angle, enhanced display property and increased production efficiency.

An alternative exemplary embodiment of the present invention provides a manufacturing method of the display device.

A display device according to an exemplary embodiment of the present invention includes: a first panel having a pixel electrode; a second panel facing the first panel and having a common electrode; a liquid crystal layer interposed between the first panel and the second panel, the liquid crystal layer having vertically-aligned liquid crystal molecules; a first alignment layer disposed on the pixel electrode; and a second alignment layer disposed on the common electrode.

At least one of the first alignment layer and the second alignment layer divides the pixel electrode into a plurality of domains, is formed to have a plurality of pretilt directions, each pretilt direction of the plurality of pretilt directions corresponding to a domain of the plurality of domains, and pretilts the vertically-aligned liquid crystal molecules in the domain according to the corresponding pretilt direction of the domain.

A sum of horizontal component directions of the pretilt direction of the domain is substantially equivalent to a sum of horizontal component directions of a fringe field at a peripheral boundary of the pixel electrode within the domain.

The pretilt direction of the at least one of the first alignment layer and the second alignment layer is directed from a peripheral region of the pixel electrode to a center region thereof.

The pretilt direction of the liquid crystal molecules is substantially equivalent to a sum of horizontal component directions of the pretilt direction of the at least one of the first alignment layer and the second alignment layer.

The first alignment layer and the second alignment layer may each include two or more alignment regions having different pretilt directions, and domains of the plurality of domains of the pixel electrode are determined by respective combinations of alignment regions of the first alignment layer and the second alignment layer, respectively.

According to an alternative exemplary embodiment of the present invention, the different pretilt directions of the two or more alignment regions of the first alignment layer are aligned toward each other, the different pretilt directions of the two or more alignment regions of the second alignment layer are aligned toward each other, and the different pretilt directions of the first alignment layer are aligned substantially perpendicular to the different pretilt directions of the second alignment layer.

At least one of the first alignment layer and the second alignment layer may form four or more domains of the plurality of domains in which the vertically-aligned liquid crystal molecules are pretilted in different directions, the four or more domains may form a single domain group, and the single domain group may correspond to the pixel electrode.

A first side of the pixel electrode may be formed at one of an obtuse angle and an acute angle with respect to an adjacent second side of the pixel electrode. Further, the first side of the pixel electrode may include at least one bent part.

A display device according to yet another exemplary embodiment of the present invention includes: a first panel having a thin film transistor, a first pixel electrode connected to the thin film transistor, and a second pixel electrode connected to the thin film transistor through a coupling capacitor; a second pixel electrode connected to the thin film transistor through a coupling capacitor; a second panel facing the first panel and having a common electrode; a liquid crystal layer interposed between the first panel and the second panel, the liquid crystal layer having vertically-aligned liquid crystal molecules; a first alignment layer disposed on the first pixel electrode and the second pixel electrode; and a second alignment layer disposed on the common electrode.

At least one of the first alignment layer and the second alignment layer divides at least one of the first pixel electrode and the second pixel electrode into a plurality of domains, is formed to have a plurality of pretilt directions, each pretilt direction of the plurality of pretilt directions corresponding to a domain of the plurality of domains, and pretilts the vertically-aligned liquid crystal molecules in the domain according to the corresponding pretilt direction of the domain.

A sum of horizontal component directions of the pretilt direction of the domain is substantially equivalent to a sum of horizontal component directions of a fringe field at a peripheral boundary of the at least one of the first pixel electrode and the second pixel electrode within the domain.

The pretilt direction of the at least one of the first alignment layer and the second alignment layer is directed from a peripheral region of the at least one of the first pixel electrode and the second pixel electrode to a center region thereof.

The pretilt direction of the liquid crystal molecules is substantially equivalent to a sum of horizontal component directions of the pretilt direction of the at least one of the first alignment layer and the second alignment layer.

The first alignment layer and the second alignment layer may each include two or more alignment regions having different pretilt directions, and domains of the plurality of domains of the pixel electrode are determined by respective combinations of alignment regions of the first alignment layer and the second alignment layer, respectively.

The different pretilt directions of the two or more alignment regions of the first alignment layer are aligned toward each other, the different pretilt directions of the two or more alignment regions of the second alignment layer are aligned toward each other, and the different pretilt directions of the first alignment layer are aligned substantially perpendicular to the different pretilt directions of the second alignment layer.

At least one of the first alignment layer and the second alignment may form four or more domains of the plurality of domains in which the vertically-aligned liquid crystal molecules are pretilted in different directions, the four or more domains form a single domain group, and the single domain group corresponds to the at least one of the first pixel electrode and the second pixel electrode.

A display device according to still another exemplary embodiment of the present invention includes: a first panel having a first thin film transistor, a first pixel electrode connected to the thin film transistor, a second thin film transistor, and a second pixel electrode connected to the second thin film transistor; a second panel facing the first panel and having a common electrode; a liquid crystal layer interposed between the first panel and the second panel, the liquid crystal layer having vertically-aligned liquid crystal molecules; a first alignment layer disposed on the first pixel electrode and the second pixel electrode; and a second alignment layer disposed on the common electrode.

At least one of the first alignment layer and the second alignment layer divides at least one of the first pixel electrode and the second pixel electrode into a plurality of domains, is formed to have a plurality of pretilt directions, each pretilt direction of the plurality of pretilt directions corresponding to a domain of the plurality of domains, and pretilts the vertically-aligned liquid crystal molecules in the domain according to the corresponding pretilt direction of the domain.

A sum of horizontal component directions of the pretilt direction of the domain is substantially equivalent to a sum of horizontal component directions of a fringe field at a peripheral boundary of the at least one of the first pixel electrode and the second pixel electrode within the domain.

The pretilt direction of the at least one of the first alignment layer and the second alignment layer is directed from a peripheral region of the at least one of the first pixel electrode and the second pixel electrode to a center region thereof.

The pretilt direction of the liquid crystal molecules is substantially equivalent to a sum of horizontal component directions of the pretilt direction of the at least one of the first alignment layer and the second alignment layer.

The first alignment layer and the second alignment layer may each include two or more alignment regions having different pretilt directions, and domains of the plurality of domains of the pixel electrode are determined by respective combinations of alignment regions of the first alignment layer and the second alignment layer, respectively.

The different pretilt directions of the two or more alignment regions of the first alignment layer are aligned toward each other, the different pretilt directions of the two or more alignment regions of the second alignment layer are aligned toward each other, and the different pretilt directions of the first alignment layer are aligned substantially perpendicular to the different pretilt directions of the second alignment layer.

At least one of the first alignment layer and the second alignment layer may form four or more domains of the plurality of domains in which the vertically-aligned liquid crystal molecules are pretilted in different directions, the four or more domains form a single domain group, and the single domain group corresponds to the at least one of the first pixel electrode and the second pixel electrode.

A method of manufacturing a display device includes: forming a first panel having a pixel electrode; forming a second panel facing the first panel and having a common electrode; forming a first alignment layer on the first panel; forming a second alignment layer on the second panel; interposing a liquid crystal layer having vertically-aligned liquid crystal molecules between the first alignment layer and the second alignment layer; dividing the pixel electrode into a plurality of domains using at least one of the first alignment layer and the second alignment layer; and pretilting the vertically-aligned liquid crystal molecules using a pretilt direction of the at least one of the first alignment layer and the second alignment layer corresponding to a domain of the plurality of domains such that a sum of horizontal component directions of the pretilt direction of the domain is substantially equivalent to a sum of horizontal component directions of a fringe field formed at a peripheral boundary of the pixel electrode within the domain.

The pretilting the vertically-aligned liquid crystal molecules using the pretilt direction of the at least one of the first alignment layer and the second alignment layer includes using a photo alignment including an exposing process using a mask.

BRIEF DESCRIPTION OF THE DRAWINGS

The above and other aspects, features and advantages of the present invention will become more readily apparent by describing in further detail exemplary embodiments thereof with reference to the accompanying drawings, in which.

DETAILED DESCRIPTION OF THE INVENTION

Figure 1:
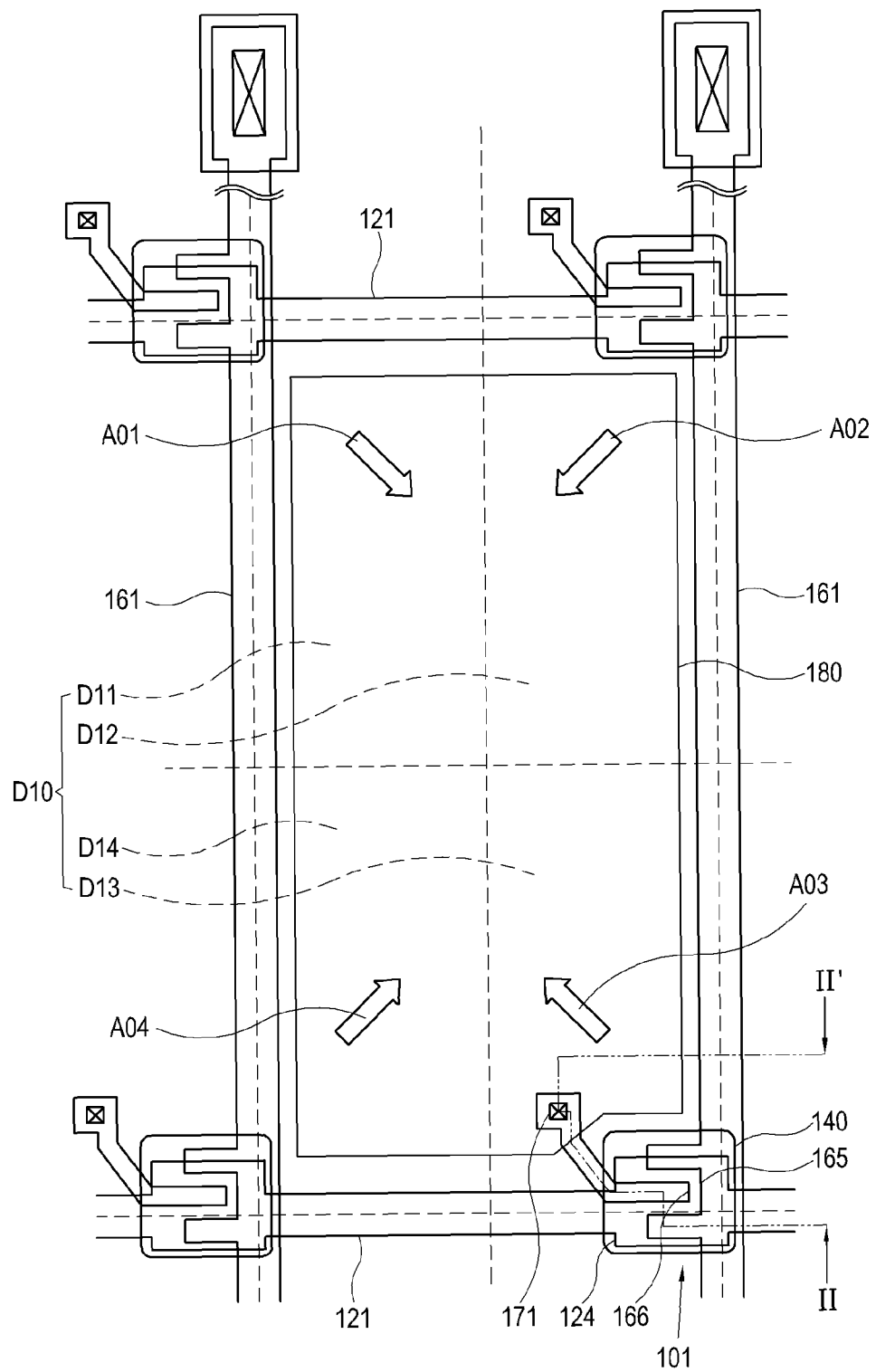
FIG. 1 is a plan view layout of a display device according to an exemplary embodiment of the present invention.

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, exemplary embodiments of the present invention will be explained in further detail with reference to the accompanying drawings. It will be understood that, since like reference numerals refer to the same or substantially similar components within the drawings, repetitive descriptions may be omitted.

Figure 2:
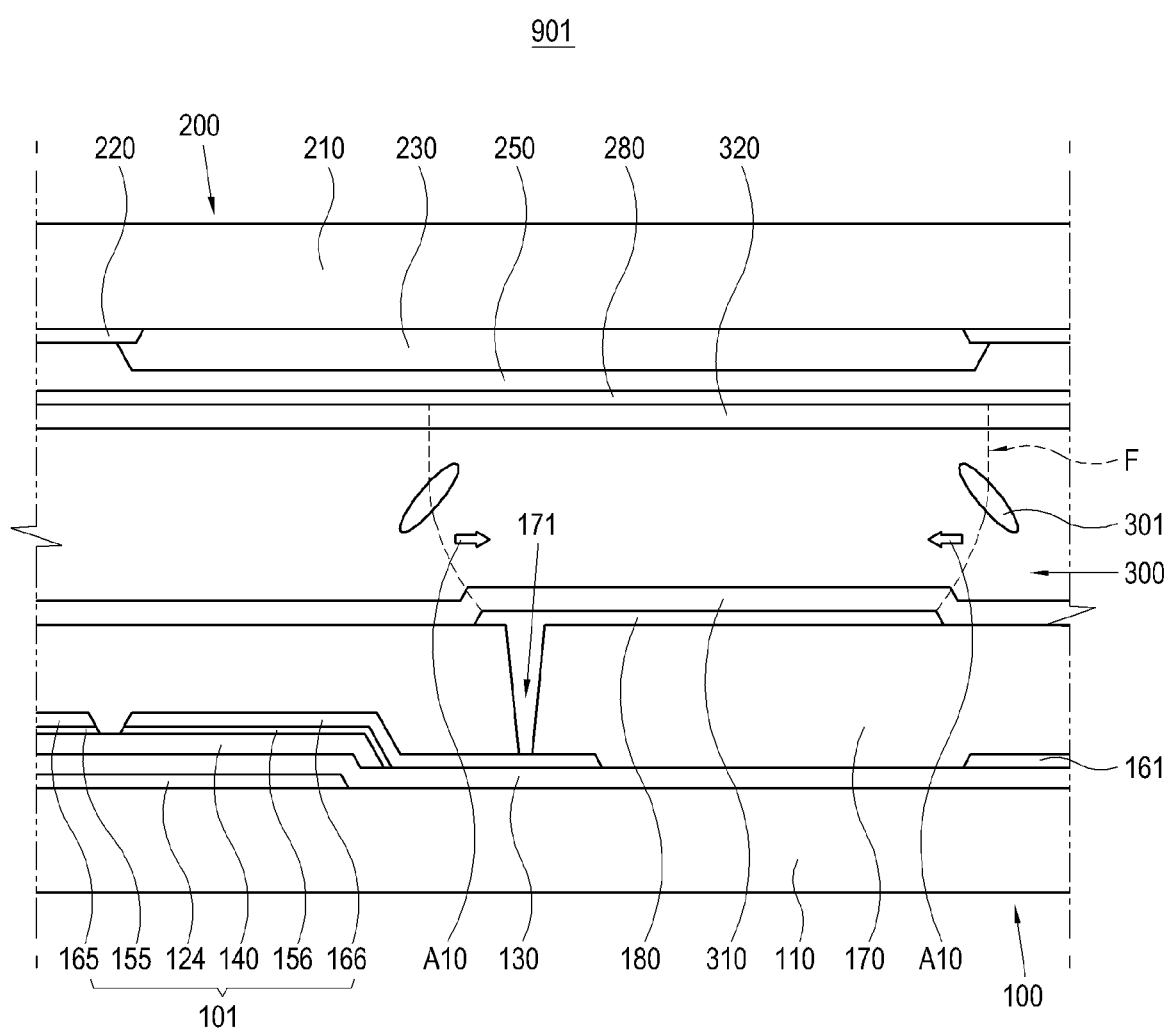
FIG. 2 is a partial cross-sectional view taken along line II-II' of the display device according to the exemplary embodiment of the present invention in FIG. 1.

FIG. 1 is a plan view layout of a display device 901 according to an exemplary embodiment of the present invention. FIG. 2 is a partial cross-sectional view taken along line II-II' of the display device 901 according to the exemplary embodiment of the present invention in FIG. 1.

As shown in FIGS. 1 and 2, the display device 901 includes a first panel 100, a second panel 200, a first alignment layer 310, a second alignment layer 320 and a liquid crystal layer 300.

The first panel 100 includes a first substrate member 110, and a thin film transistor ("TFT") 101 and a pixel electrode 180 which are formed on the first substrate member 110. The first panel 100 further includes a gate line 121 and a data line 161.

The first substrate member 110 includes a transparent material such as glass, quartz, ceramic or plastic, for example, but is not limited thereto.

Hereinafter, a configuration of the first panel 100 will be described in further detail with reference to FIGS. 1 and 2.

A plurality of gate lines 121 and a plurality of gate electrodes 124 branched from the gate lines 121 are formed on the first substrate member 110. Gate lines 121 of the plurality of gate lines 121 and gate electrodes 124 of the plurality of gate electrodes 124 may further include a first storage electrode line (not shown).

In an exemplary embodiment of the present invention, the gate lines 121 and the gate electrodes 124 include a metal such as Al, Ag, Cr, Ti, Ta and Mo or an alloy thereof. Further, FIG. 2 illustrates the gate lines 121 and the gate electrodes 124 as each being formed of a single layer. In alternative exemplary embodiments, however, the gate lines 121 and the gate electrodes 124 may have multiple layers having a first metal layer made of Cr, Mo, Ti, Ta or an alloy thereof which have good physical and chemical properties, and a second metal layer made of an Al series or an Ag series having a low resistance, for example, but not being limited thereto. In other alternative exemplary embodiments, the gate lines 121 and the gate electrodes 124 may include various metals and/or conductive materials in multiple layers patterned by an etching method, for example.

A gate insulating layer 130 including silicon nitride ("SiNx"), for example, is formed on the gate lines 121 and the gate electrodes 124.

A plurality of data lines 161 and a plurality of gate lines 121 are formed on the gate insulating layer 130. Data lines 161 of the plurality of data lines 161 are longitudinally arranged in a direction substantially perpendicular to a direction in which gate lines 121 of the plurality of gate lines 121 are longitudinally arranged, as shown in FIG. 1. Further, a source electrode 165 branches from each data line 161, and a drain electrode 166 is spaced apart from the source electrode 165. The data lines 161, source electrodes 165 and drain electrodes 166 may further include a second storage electrode line (not shown), such that the first storage electrode line of the gate lines 121 and the second storage electrode line form a capacitor.

Like the gate lines 121 and the gate electrodes 124, the data lines 161, source electrodes 165 and drain electrodes 166 include a conductive material such as Cr, Mo, Al or an alloy thereof, for example, but are not limited thereto. The data lines 161, source electrodes 165 and drain electrodes 166 may be formed in a single layer or, alternatively, in multiple layers.

A semiconductor layer 140 is formed between the gate insulating layer 130 and the source electrodes 165 and drain electrodes 166. Thus, the gate electrodes 124, the source electrodes 165 and the drain electrodes 166 serve as electrodes of a respective thin film transistor 101. Further, the semiconductor layer 140 formed between a source electrode 165 and a drain electrode 166 of the respective thin film transistor 101 is a channel region of the respective thin film transistor 101.

Ohmic contact members 155 and 156 are formed under each of the source electrodes 165 and the drain electrodes 166 to reduce a contact resistance therebetween. In an exemplary embodiment, the ohmic contact members 155 and 156 include amorphous silicon ("a-Si") highly doped with an n-type dopant, for example, but are not limited thereto.

A passivation layer 170 is formed on the data lines 161, source electrodes 165 and drain electrodes 166. The passivation layer 170 includes an insulating material with a low permittivity such as a-Si:C:O and/or a-Si:O:F formed by a plasma enhanced chemical vapor deposition ("PECVD"), for example, or an inorganic insulating material such as silicon nitride or silicon oxide, for example, but not being limited thereto.

Still referring to FIGS. 1 and 2, a plurality of pixel electrodes 180 is formed on the passivation layer 170. Pixel electrodes 180 of the plurality of pixel electrodes 180 include a transparent conductive material such as indium tin oxide ("ITO") or indium zinc oxide ("IZO"), for example, but are not limited thereto.

The passivation layer 170 is formed to have contact holes 171 which expose a portion of a respective drain electrode 166 therethrough. Further, the pixel electrodes 180 are electrically connected to the drain electrodes 166 through the contact holes 171.

The second panel 200 includes a second substrate member 210 and a common electrode 280 formed on the second substrate member 210. The common electrode 280 is formed on a surface of the second substrate member 210 facing the first panel 100. The second panel 200 further includes a light blocking member 220, a color filter 230 and an overcoat layer 250.

Hereinafter, a configuration of the second panel 200 will be described in further detail with reference to FIGS. 1 and 2.

The second substrate member 210 includes a transparent material such as glass, quartz, ceramic or plastic, for example, but is not limited thereto. The second substrate member 210 may be formed of the same material as the first substrate member 110, but alternative exemplary embodiments of the present invention are not limited thereto.

The light blocking member 220 is formed on the second substrate member 210. Further, the light blocking member 220 includes an opening (not labeled) facing the pixel electrodes 180 of the first panel 100, and prevents light from leaking between adjacent pixel electrodes 180. More specifically, the light blocking member 220 is formed corresponding to the thin film transistor 101 to block light from the semiconductor layer 140 of the thin film transistor 101.

The light blocking member 220 may include a photoresistive organic material having a black pigment, for example, to block light. The black pigment may include carbon black or titanium oxide, for example, but is not limited thereto.

The color filter 230 includes three primary colors, e.g., red, green and blue, sequentially provided on the second substrate member 210 having the light blocking member 220. A color of the color filter 230 is not limited to the three primary colors. Boundaries of color filters 230 having different colors are disposed on the light blocking member 220, but are not limited thereto. For example, in an alternative exemplary embodiment, circumferences of the neighboring color filters 230 may overlap to block light leakage, in which case the light blocking member 220 may be omitted.

The overcoat layer 250 is formed on the light blocking member 220 and the color filters 230. The overcoat layer 250 protects the color filters 230 and provides planar surface. The overcoat layer 250 may be omitted in alternative exemplary embodiments of the present invention.

The common electrode 280 is formed on the overcoat layer 250 to form an electric field between the common electrode 180 and the pixel electrodes 180. The common electrode 280 includes a transparent conductive material such as ITO or indium zinc oxide IZO, for example, but is not limited thereto.

In alternative exemplary embodiments, the first panel 100 and the second panel 200 are not limited to the configurations described herein. Rather, the first panel 100 and the second panel 200 may include various other configurations than those shown in FIGS. 1 and 2 in alternative exemplary embodiments.

The liquid crystal layer 300 includes liquid crystal molecules 301 and is disposed between the first panel 100 and the second panel 200, as shown in FIG. 2. In an exemplary embodiment of the present invention, the liquid crystal molecules 301 are substantially vertically aligned.

The first alignment layer 310 is disposed on the pixel electrodes 180 and the second alignment layer 320 is disposed on the common electrode 280. More specifically, the liquid crystal layer 300 is disposed between the first alignment layer 310 and the second alignment layer 320. The liquid crystal molecules 301 of the liquid crystal layer 300 are vertically aligned by and between the first alignment layer 310 and the second alignment layer 320.

At least one of the first alignment layer 310 and the second alignment layer 320 is formed by a tilted light exposing method and thereby pretilts the liquid crystal molecules 301 vertically aligned on a surface thereof. Thus, at least one of the first alignment layer 310 and the second alignment layer 320 has a pretilt direction.

Figure 3:
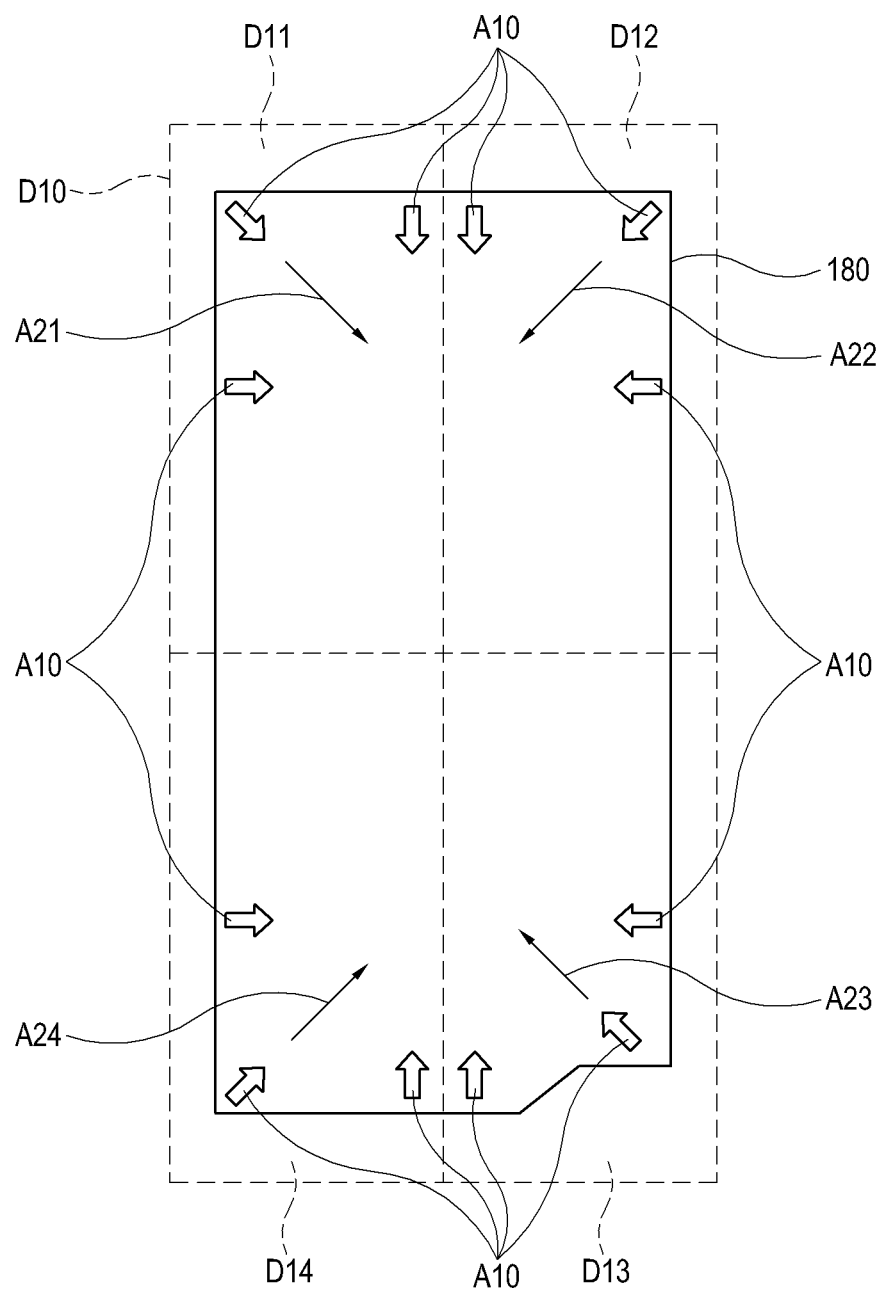
FIG. 3 is a plan view layout of a pixel electrode of the display device according to the exemplary embodiment of the present invention in FIG. 1.

Referring now to FIG. 3, which is a plan view layout of a pixel electrode of the display device according to the exemplary embodiment of the present invention in FIG. 1, at least one of the first alignment layer 310 and the second alignment layer 320 divides a single pixel electrode 180 into a single domain group D10. The single domain group D10 includes a first domain D11, a second domain D12, a third domain D13 and a fourth domain D14. The first domain D11, the second domain D12, the third domain D13 and the fourth domain D14 correspond to the single pixel electrode 180 and each have a different pretilt direction of the liquid crystal molecules 301.

More specifically, the first alignment layer 310 and the second alignment layer 320 vertically align the liquid crystal molecules 301 of the liquid crystal layer 300 when a voltage is not applied between the pixel electrodes 180 and the common electrode 280, e.g., there is no electric field therebetween. One of the first alignment layer 310 and the second alignment layer 320 has a pretilt direction. Therefore, the vertically-aligned liquid crystal molecules 301 are pretilted in the pretilt direction of one of the first alignment layer 310 and the second alignment layer 320, e.g., is in a pretilt state. In the pretilt state, the vertically-aligned liquid crystal molecules 301 tilt at a predetermined angle. Put another way, the pretilt direction refers to a direction in which the liquid crystal molecules 301 pretilt on a surface of the first alignment layer 310 and/or the second alignment layer 320, e.g., the pretilt direction is an angle of inclination. Thus, the liquid crystal molecules 301 are substantially vertically aligned and tilt in the pretilt direction on the surface of the first alignment layer 310 and the second alignment layer 320. In an exemplary embodiment of the present invention, the liquid crystal molecules 301 are pretilted in a range from about 0.1° to about 2° from a vertical direction substantially perpendicular to the opposite and facing surfaces of the first substrate member 110 and the second substrate member 210.

Since the liquid crystal molecules 301 pretilt in respective particular directions in each of the first domain D11, the second domain D12, the third domain D13 and the fourth domain D14, the liquid crystal molecules 301 tilt in predetermined particular directions in each of the first domain D11, the second domain D12, the third domain D13 and the fourth domain D14 when an electric field is formed between the pixel electrode 180 and the common electrode 280. Thus, a response speed and a display property of the display device 901 according to an exemplary embodiment of the present invention is effectively improved and/or substantially enhanced.

According to an exemplary embodiment of the present invention, the first alignment layer 310 and the second alignment layer 320 cooperatively divide the single pixel electrode 180 into the single domain group D10, e.g., into the first domain D11, the second domain D12, the third domain D13 and the fourth domain D14. Referring again to FIG. 1, a dotted line represents a boundary between the first domain D11, the second domain D12, the third domain D13 and the fourth domain D14 divided by the first alignment layer 310 and the second alignment layer 320. More specifically, both the first alignment layer 310 and the second alignment layer 320 have pretilt directions. Further, the first alignment layer 310 and the second alignment layer 320 thereby include at least two of a first alignment region E11, a second alignment region E12, a third alignment region E23 and a fourth alignment region E24 (FIGS. 4 and 5) each having a different pretilt direction. As the first alignment region E11 and the second alignment region E12 of the first alignment layer 310 and the third alignment region E23 and the fourth alignment region E24 of the second alignment layer 320 are combined to form the single domain group D10, in which the liquid crystal molecules 301 pretilt in different directions depending on which individual domain, e.g., the first domain D11, the second domain D12, the third domain D13 or the fourth domain D14 the liquid crystal molecules 301 are located within.

A pretilt direction of the liquid crystal molecules 301 is thereby substantially equivalent to a sum of horizontal component directions of the individual pretilt directions of the first alignment layer 310 and the second alignment later 320. Hereinafter, the horizontal component directions refer to directions substantially parallel to opposing facing surfaces of the first panel 100 and the second panel 200.

If one of the first alignment layer 310 and the second alignment layer 320 does not have a pretilt direction, e.g., if one of the first alignment layer 310 and the second alignment layer 320 does not pretilt the liquid crystal molecules 301, there will be no horizontal component directions of the pretilt directions of the respective alignment layer. In this case, the liquid crystal molecules 301 pretilt in a pretilt direction of another alignment layer of the first alignment layer 310 and the second alignment layer 320. Put another way, the first domain D11, the second domain D12, the third domain D13 and the fourth domain D14 are divided by only the respective alignment layer of the first alignment layer 310 and the second alignment layer 320 having the pretilt directions.

As described above in greater detail, the first domain D11, the second domain D12, the third domain D13 and the fourth domain D14 which pretilts the liquid crystal molecules 301 in different directions form a single domain group, e.g., the single domain group D10. More specifically, the first alignment layer 310 and the second alignment layer 320 form the first domain D11, the second domain D12, the third domain D13 and the fourth domain D14 pretilting the liquid crystal molecules 301 in different directions, and the first domain D11, the second domain D12, the third domain D13 and the fourth domain D14 form the single domain group having the single domain group D10. At least one single domain group D10 is formed corresponding to a single pixel electrode 180, as shown in FIG. 1, which illustrates the single domain group D10 corresponding to the single pixel electrode 180.

Generally, a fringe field is formed in a substantially vertical direction between the pixel electrodes 180 and the common electrode 280 when a voltage is applied, e.g., an electric field exists, between the pixel electrodes 180 and the common electrode 280. While the common electrode 280 is formed to cover the entire surface of the second substrate member 210, the pixel electrodes 180 are respectively provided in pixels, e.g., pixel area (not specifically labeled). As a result, cutting areas exist between adjacent pixel electrodes 180, and a fringe field F which is uncontrolled forms at a boundary of the pixel electrodes 180 as shown in FIG. 2. More specifically, the fringe field F forms at the boundary of the pixel electrode 180, and bends inward, e.g., toward a center of the pixel electrode 180, instead of being vertical between the pixel electrode 180 and the common electrode 280. The horizontal component direction of the fringe field F formed at the boundary of the pixel electrode 180 is equivalent to a fringe field direction A10 shown in FIGS. 2 and 3.

When an electric field is formed between the pixel electrode 180 and the common electrode 280, the vertically aligned liquid crystal molecules 301 are aligned in a controlled direction substantially vertical to the electric field. However, liquid crystal molecules 301 aligned at the boundary of the pixel electrodes 180 are aligned in another direction, e.g., are not aligned in the controlled direction substantially vertical to the electric field, due to the fringe field F formed at the boundary of the pixel electrodes 180, as shown in FIG. 2. Hereinafter, the controlled direction refers to a direction to which the liquid crystal molecules 301 pretilt from the respective first domain D11, the second domain D12, the third domain D13 and the fourth domain D14. More specifically, the liquid crystal molecules 301 disposed at the boundary of the pixel electrodes 180 tilt in the horizontal component directions of the fringe field F formed at the boundary of the pixel electrodes 180 instead of in the pretilt direction of the respective first domain D11, the second domain D12, the third domain D13 or the fourth domain D14.

If the sum direction of the horizontal component directions of the fringe field F formed at the boundary of the pixel electrodes 180 is substantially equivalent to the pretilt directions of the liquid crystal molecules 301 from the respective first domain D11, the second domain D12, the third domain D13 and the fourth domain D14, collision and interference between the liquid crystal molecules 301 is substantially reduced or effectively minimized. To ensure that the sum direction of the horizontal component directions of the fringe field F formed at the boundary of the pixel electrodes 180 is substantially equivalent to the pretilt directions of the liquid crystal molecules 301 from the respective first domain D11, the second domain D12, the third domain D13 and the fourth domain D14, the pretilt directions of the liquid crystal molecules 301 in the respective first domain D11, the second domain D12, the third domain D13 and the fourth domain D14 are substantially the same as a first pretilt direction A01, a second pretilt direction A02, a third pretilt direction A03 and a fourth pretilt direction A04, respectively, as shown in FIG. 1.

Thus, in an exemplary embodiment of the present invention the liquid crystal molecules 301 are prevented from colliding and creating a texture, e.g., a dark space formed when the pretilt directions of the liquid crystal molecules 301 are not controlled. Therefore, a viewing angle of the display device 901 according to an exemplary embodiment improves, and display property is substantially enhanced while and production efficiency is effectively improved.

Hereinafter, the fringe field F formed at the boundary of the pixel electrodes 180 in the respective first domain D11, the second domain D12, the third domain D13 and the fourth domain D14, and the pretilt directions of the first alignment layer 310 and the second alignment layer 320 will be described in further detail with respect to FIGS. 3-5.

The fringe field F formed at the boundary of the pixel electrodes 180 will now be described in further detail with reference to FIG. 3.

The arrows in FIG. 3 correspond to respective fringe field directions A10, e.g., horizontal component directions of the fringe field F formed at the boundary of the pixel electrodes 180 or alignment directions of the liquid crystal molecules 301 by the fringe field F. The sum directions of the horizontal component directions of the fringe field F formed in the fringe of the pixel electrodes 180 in the first domain D11, the second domain D12, the third domain D13 and the fourth domain D14 are shown in FIG. 3 as a first horizontal component direction ("HCD") A21, a second HCD A22, a third HCD A23 and a fourth HCD A24, respectively. A horizontal component direction of the fringe field F formed at the boundary of the pixel electrodes 180 may gradually change depending on a position of a given pixel electrode 180. However, on average, the alignment direction of the liquid crystal molecules 301 by the fringe field F formed at the boundary of the pixel electrodes 180 in the respective first domain D11, the second domain D12, the third domain D13 and the fourth domain D14 are substantially the same as the first HCD A21, the second HCD A22, the third HCD A23 and the fourth HCD A24, since the sum directions of the horizontal component directions of the fringe field F formed at the boundary of the pixel electrodes 180 in the respective domains represented by the first HCD A21, the second HCD A22, the third HCD A23 and the fourth HCD A24 are typical alignment directions of the liquid crystal molecules 301 by the fringe field F in the respective first domain D11, the second domain D12, the third domain D13 and the fourth domain D14.

The alignment regions and the pretilt directions of the first alignment layer 310 and the second alignment layer 320 will now be described in further detail with reference to FIGS. 4 and 5.

Figure 4:
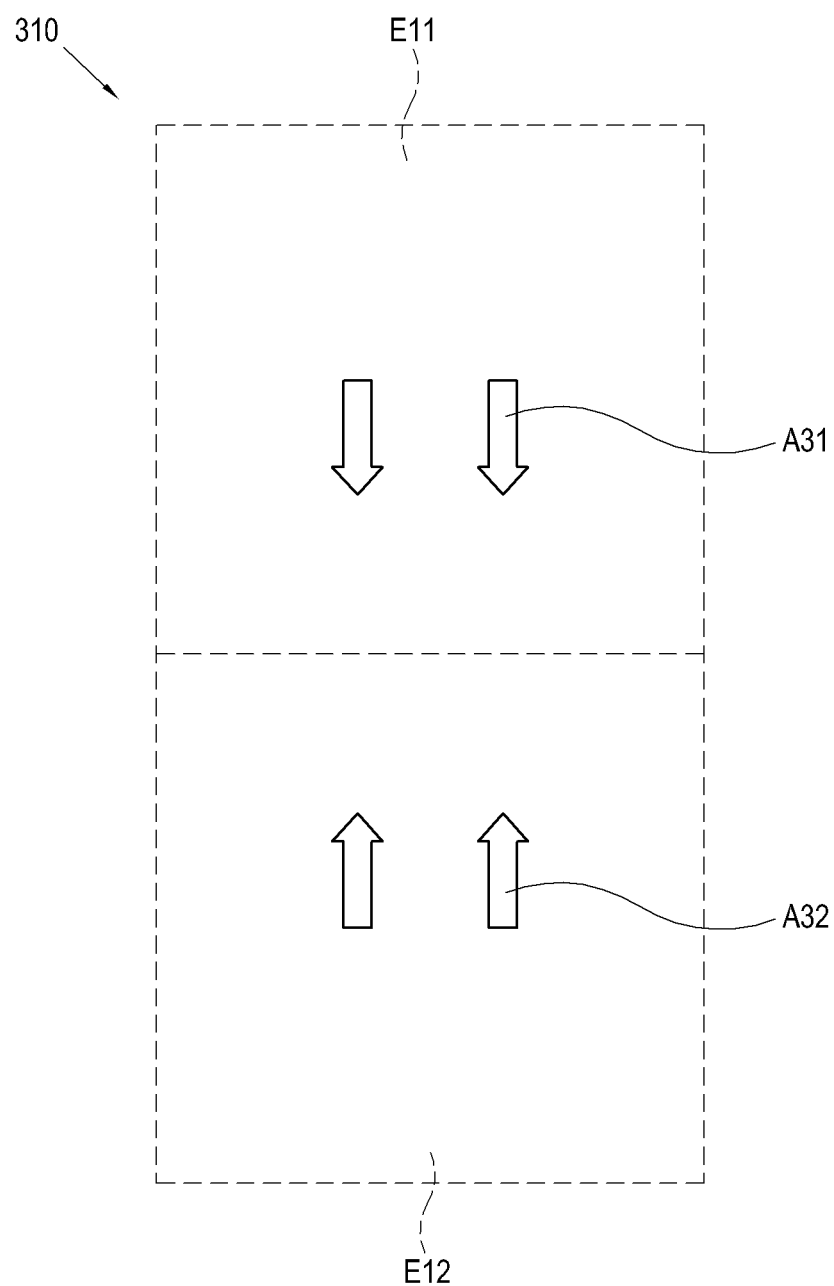
FIG. 4 is a plan view layout which illustrates pretilt directions of a first alignment layer of the display device according to the exemplary embodiment of the present invention in FIG. 1.

FIG. 4 is a plan view layout which illustrates the first alignment region E11 and the second alignment region E12 and corresponding first pretilt direction A31 and second pretilt direction A32, respectively, formed on the first alignment layer 310 of the display device according to the exemplary embodiment of the present invention in FIG. 1. The first alignment layer 310 includes the first alignment region E11 having the first pretilt direction A31, and the second alignment region E12 having the second pretilt direction A32 facing the first pretilt direction A31. More specifically, the first alignment layer 310 includes the first alignment region E11 and the second alignment region E12 which divide a single pixel having a corresponding pixel electrode 180 in a longitudinal direction with respect to the pixel electrode 180, e.g., into an upper part and a lower part, which correspond to the first alignment region E11 and the second alignment region E12, as shown in FIG. 4.

Figure 5:
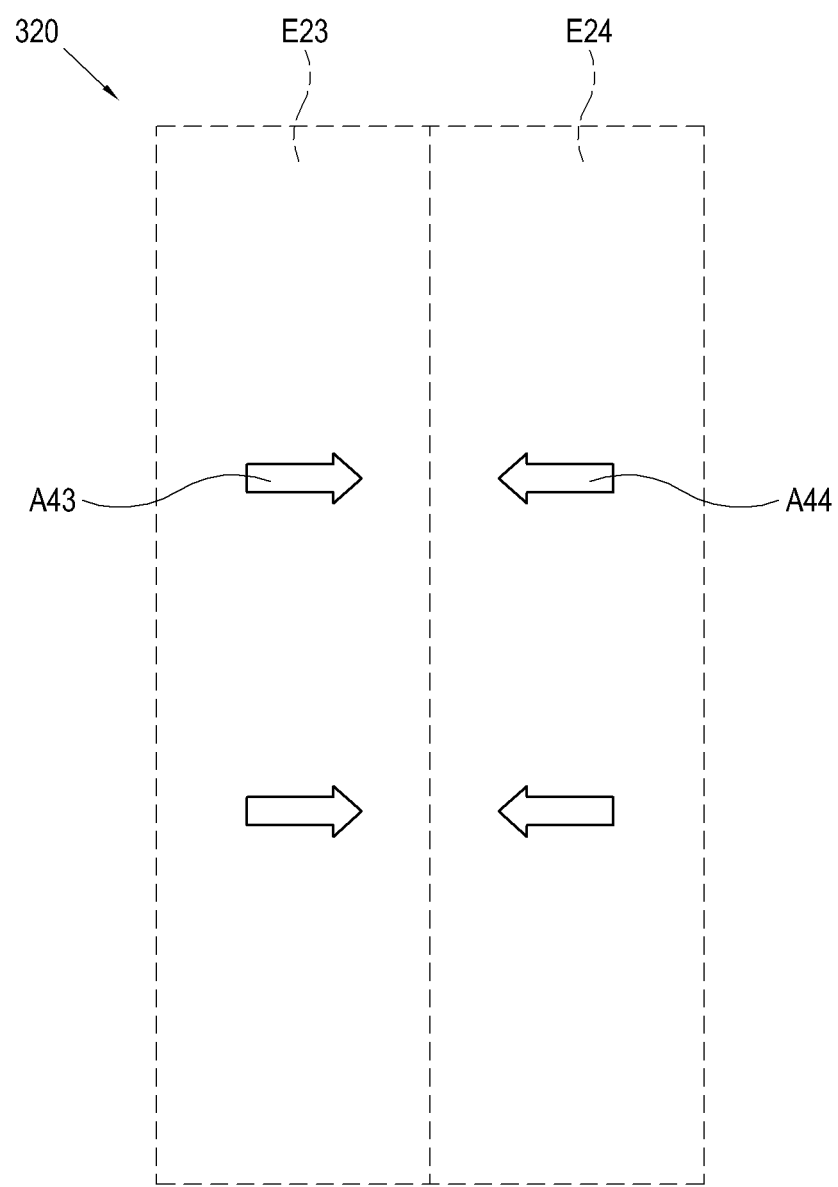
FIG. 5 is a plan view layout which illustrates pretilt directions of a second alignment layer of the display device according to the exemplary embodiment of the present invention in FIG. 1.

FIG. 5 is a plan view layout which illustrates the third alignment region E23 and the fourth alignment region E24 and corresponding third pretilt direction A43 and fourth pretilt direction A44, respectively, formed on the second alignment layer 320 of the display device according to the exemplary embodiment of the present invention in FIG. 1. More specifically, the second alignment layer 320 includes the third alignment region E23 having the third pretilt direction A43 substantially perpendicular to the first pretilt direction A31 and the second pretilt direction A32, and the fourth alignment region E24 having the fourth pretilt direction A44 facing the third pretilt direction A43. Further, the second alignment layer 320 includes the third alignment region E23 and the fourth alignment region E24 which divide a single pixel having a corresponding pixel electrode 180 in a substantially transverse direction of the pixel electrode 180, e.g., into a left part and a right part which correspond to the third alignment region E23 and the fourth alignment region E24, as shown in FIG. 5.

Referring still to FIGS. 4 and 5, the first pretilt direction A31 and the second pretilt direction A32 of the first alignment layer 310 face each other. In addition, the third pretilt direction A43 and the second pretilt direction A44 of the second alignment layer 320 face each other. Further, the first pretilt direction A31 and the second pretilt direction A32 of the first alignment layer 310 are substantially perpendicular to the third pretilt direction A43 and the fourth pretilt direction A44 of the second alignment layer 320.

Figure 6:
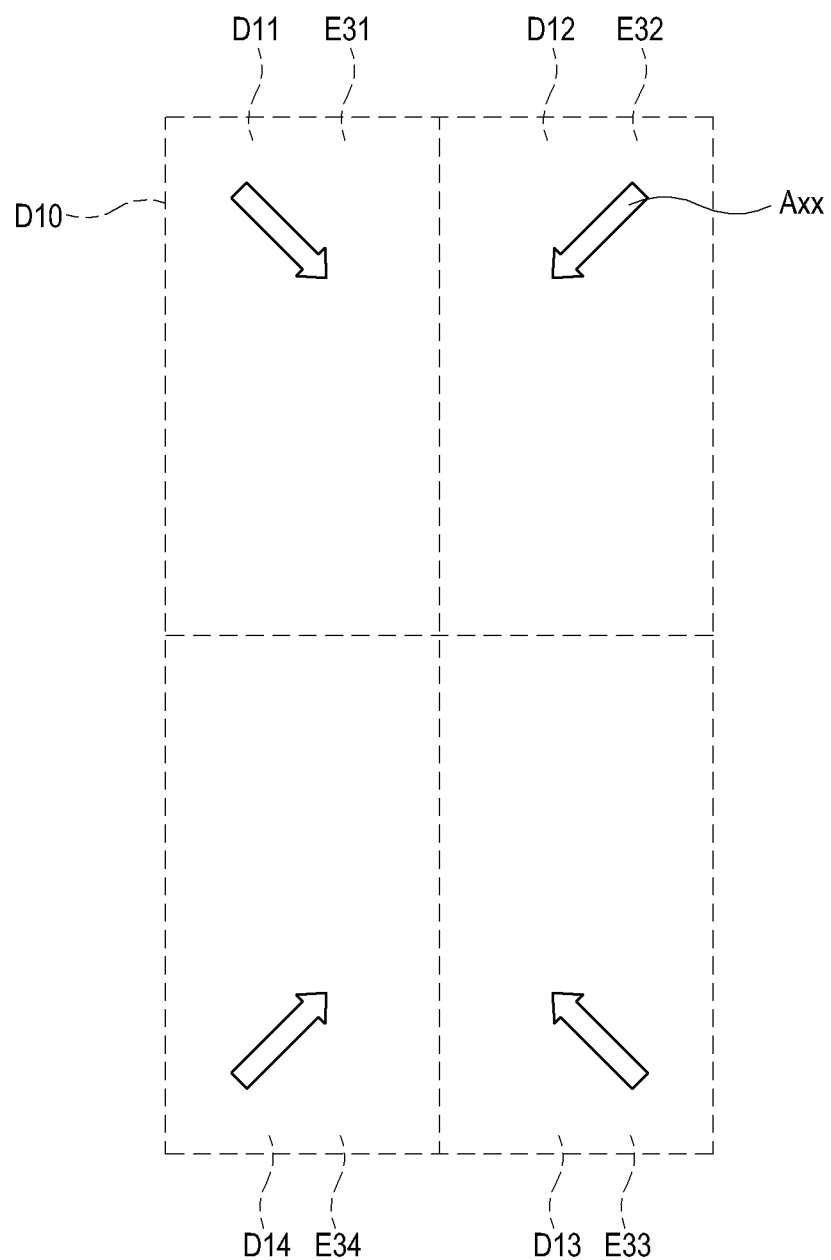
FIG. 6 is a plan view layout which illustrates pretilt directions of a first alignment layer and a second alignment layer in a display device according to an alternative exemplary embodiment of the present invention.

The first pretilt direction A31 and the second pretilt direction A32 of the first alignment layer 310 and the third pretilt direction A43 and the fourth pretilt direction A44 of the second alignment layer 320 are substantially oriented toward a center of the pixel electrode 180 from a peripheral boundary thereof, as shown in FIGS. 5 and 6.

The first alignment layer 310 and the second alignment layer 320 are formed by a photo alignment method, for example. In an exemplary embodiment, the photo alignment method includes an exposing process which uses a mask. Further ultraviolet ("UV") light may be used in the exposing process. A tilted exposure process is used in the exposing process, as well. The tilted exposure process includes an exposure including tilting a substrate, an exposure including tilting a light source and an exposure including dividing a single light source using a lens or a reflection plate, for example.

The first alignment layer 310 divided into the first alignment region E11 and the second alignment region E12, and the second alignment layer 320 divided into the third alignment region E23 and the fourth alignment region E24 are formed by a partial selective exposure using a mask. For example, the first alignment layer 310 and the second alignment layer 320 may be formed by two exposing processes using the mask. In addition to the photo alignment method steps described herein, the photo alignment method may include various other known methods.

Referring to FIGS. 3-5, an overlapping portion of the first alignment region E11 of the first alignment layer 310 with the third alignment region E23 of the second alignment layer 320 is the first domain D11. An overlapping portion of the first alignment region E11 of the first alignment layer 310 with the fourth alignment region E24 of the second alignment layer 320 is the second domain D12. An overlapping portion of the second alignment region E12 of the first alignment layer 310 with the third alignment region E23 of the second alignment layer 320 is the third domain D13. An overlapping portion of the second alignment region E12 of the first alignment layer 310 with the fourth alignment region E24 of the second alignment layer 320 is the fourth domain D14.

Referring to FIGS. 4 and 5, as a result of the respective overlapping portions which define the first domain D11, the second domain D12, the third domain D13 and the fourth domain D14, as described in greater detail above, liquid crystal molecules 301 in the first domain D11 are vertically aligned to pretilt in a sum direction of horizontal component directions of the first pretilt direction A31 and the third pretilt direction A43. Further, liquid crystal molecules 301 in the second domain D12 are vertically aligned to pretilt in a sum direction of horizontal component directions of the first pretilt direction A31 and the fourth pretilt direction A44. In addition, liquid crystal molecules 301 in the third domain D13 are vertically aligned to pretilt in a sum direction of a horizontal component directions of the second pretilt direction A32 and the third pretilt direction A43. Finally, liquid crystal molecules 301 in the fourth domain D14 are vertically aligned to pretilt in a sum direction of a horizontal component direction of the second pretilt direction A32 and the fourth pretilt direction A44.

Thus, the first alignment layer 310 and the second alignment layer 320 have predetermined pretilt directions such that sum directions of the horizontal component directions of the first pretilt direction A31 and the third pretilt direction A43 are substantially equivalent to that of the fringe field F formed at the boundary of the pixel electrodes 180 in the first domain D11, as described above in greater detail.

Similarly, the first alignment layer 310 and the second alignment layer 320 have predetermined pretilt directions such that sum directions of horizontal component directions of the first pretilt direction A31 and the fourth pretilt direction A44 are substantially equivalent to that of the fringe field F formed at the boundary of the pixel electrodes 180 in the second domain D12.

Likewise, the first alignment layer 310 and the second alignment layer 320 have predetermined pretilt directions such that sum directions of horizontal component directions of the second pretilt direction A32 and the third pretilt direction A43 are substantially equivalent to that of the fringe field F formed at the boundary of the pixel electrodes 180 in the third domain D13.

Finally, the first alignment layer 310 and the second alignment layer 320 thus have predetermined pretilt directions so that sum directions of horizontal component directions of the second pretilt direction A32 and the fourth pretilt direction A44 are substantially equivalent to that of the fringe field F formed at the boundary of the pixel electrodes 180 in the fourth domain D14.

As a result, the first pretilt direction A01, the second pretilt direction A02, the third pretilt direction A03 and the fourth pretilt direction A04 (FIG. 1) of the liquid crystal molecules 301 aligned by the first alignment layer 310 and the second alignment layer 320 are substantially equivalent to the first HCD A21, the second HCD A22, the third HCD A23 and the fourth HCD A24 (FIG. 3) of the horizontal component directions of the fringe field F formed at the boundary of the pixel electrodes 180, in the respective domains of the first domain D11, the second domain D12, the third domain D13 and the fourth domain D14.

FIG. 1 illustrates the single domain group D10 formed in the single pixel having a corresponding pixel electrode 180. However, alternative exemplary embodiments of the present invention are not limited thereto. Alternatively, for example, but not being limited thereto, two or more domain groups D10 may be formed in a single pixel.

In exemplary embodiments of the present invention as described in greater detail above, a viewing angle of the display device 901 substantially improves, a display property is substantially enhanced and production efficiency is effectively increased.

More specifically, the sum directions of the horizontal component directions of the fringe field F formed at the boundary of the pixel electrodes 180 in the respective domains are substantially equivalent to those of the horizontal component directions of the pretilt directions of the first and second alignment layer 310 and the second alignment layer 320. In exemplary embodiments, there may be an error within a range of approximately 5° between the sum directions of the horizontal component directions of the fringe field F formed at the boundary of the pixel electrodes 180, and the sum directions of the horizontal component directions of the pretilt directions of the first alignment layer 310 and the second alignment layer 320.

As a result, collisions between the liquid crystal molecules 301 are substantially reduced or effectively minimized as a result of the fringe field F formed in the fringe of the pixel electrodes 180 and the pretilt directions of the liquid crystal molecules 301 by the first alignment layer 310 and the second alignment layer 320. As a result of the collisions between the liquid crystals 301 being substantially reduced or effectively minimized, a texture, e.g., a dark space, is prevented in the display device 901 according to exemplary embodiments of the present invention.

Further, a pattern is not required in the common electrode 280 to pretilt the liquid crystal molecules 301 of the liquid crystal layer 300, since the liquid crystal molecules 301 are pretilted by the first alignment layer 310 and the second alignment layer 320. Thus, a production process of the display device 901 is simplified. For example, the first alignment layer 310 and the second alignment layer 320 pretilt the liquid crystal molecules 301 as well as vertically align the liquid crystal molecules 301 of the liquid crystal layer 300. The first alignment layer 310 and the second alignment layer 320 may be formed by an exposing method using a mask, as described above in greater detail. Therefore, an additional process for pretilting the liquid crystal molecules 301 by the first alignment layer 310 and the second alignment layer 320 is minimized.

A manufacturing method of the display device 901 according to an exemplary embodiment of the present invention will now be described in further detail. The first panel 100 and the second panel 200 are manufactured by various known methods, and a detailed description thereof will therefore not be provided herein.

Referring to FIG. 2, the first alignment layer 310 is formed on the first panel 100 including the thin film transistor 101 and the pixel electrode 180. The first alignment layer 310 is divided into the first alignment region E11 and the second alignment region E12 (FIG. 4) aligned in different directions, as described above in greater detail. As shown in FIG. 4, the first alignment layer 310 includes the first alignment region E11 having the first pretilt direction A31, and the second alignment region E12 having the second pretilt direction A32 facing the first pretilt direction A31.

The first alignment layer 310 is formed by a photo alignment method, e.g., by an exposing process using a mask. More specifically, a photo alignment material is first provided on the pixel electrodes 180 of the first panel 100. The photo alignment material may include various known materials. The first alignment region E11 is then exposed by UV light while the mask covers other regions, e.g., the second alignment region E12, thereby aligning the first alignment region E11 in the first pretilt direction A31. The second alignment region E12 is then exposed to UV light while the mask covers other regions, e.g., the first alignment region E11, thereby aligning the second alignment region E12 in the second pretilt direction A32. Thus, the first alignment layer 310 which is divided into the first alignment region E11 and the second alignment region E12 is formed. The first alignment region E11 and the second alignment region E12 of the first alignment layer 310 divide the single pixel in a longitudinal direction, e.g., into an upper part and a lower part, as described above in greater detail and illustrated in FIG. 4.

Next, the second alignment layer 320 is formed on the second panel 200 including the common electrode 280. More specifically, the second alignment layer 320 is divided into the third alignment region E23 and the fourth alignment region D24 (FIG. 5) aligned in different directions. As shown in FIG. 5, the second alignment layer 320 includes the third alignment region E23 having the third pretilt direction A43, and the fourth alignment region E24 having the fourth pretilt direction A44 facing the third pretilt direction A43.

The second alignment layer 320 is formed by the same or a substantially similar method as the first alignment layer 310. Thus, the photo alignment material is first provided on the common electrode 280 of the second panel 200. The third alignment region E23 is then exposed to UV light while the mask covers other regions, e.g., the fourth alignment region E24, thereby aligning the third alignment region E23 in the third pretilt direction A43. The fourth alignment region E24 is then exposed to UV light while the mask covers other regions, e.g., the third alignment region E23, thereby aligning the fourth alignment region E24 in the fourth pretilt direction A44. As a result, the second alignment layer 320 which is divided into the third alignment region E23 and the fourth alignment region E24 is formed. The third alignment region E23 and the fourth alignment region E24 of the second alignment layer 320 divide the single pixel in a transverse direction, e.g., into left part and a right part, as described above in greater detail and illustrated in FIG. 5.

Next, the first panel 100 having the first alignment layer 310 and the second panel 200 having the second alignment layer 320 are disposed to face each other, and are then adhered to each other. The liquid crystal layer 300 including the plurality of vertically aligned liquid crystal molecules 301 is interposed between the first panel 100 and the second panel 200, thereby forming the display device 901.

Alternative exemplary embodiments of the present invention are not limited to the description above. Alternatively, for example, the liquid crystal layer 300 may be disposed on one of the first panel 100 and the second panel 200 before the first panel 100 and the second panel 200 are adhered to each other, but alternative exemplary embodiments of the present invention are not limited thereto.

The first alignment layer 310 and the second alignment layer 320 divide a corresponding single pixel electrode 180 into the first domain D11, the second domain D12, the third domain D13 and the fourth domain D14. Therefore, the combined first alignment region E11 and the second alignment region E12 of the first alignment layer 310, and the third alignment region E23 and the fourth alignment region E24 of the second alignment layer 320 form the first domain D11, the second domain D12, the third domain D13 and the fourth domain D14 in which the liquid crystal molecules 301 pretilt in predetermined directions. More specifically, an overlapping part between the first alignment region E11 of the first alignment layer 310 and the third alignment region E23 of the second alignment layer 320 is the first domain D11. Likewise, an overlapping part between the first alignment region E11 of the first alignment layer 310 and the fourth alignment region E24 of the second alignment layer 320 is the second domain D12. Similarly, an overlapping part between the second alignment region E12 of the first alignment layer 310 and the third alignment region E23 of the second alignment layer 320 is the third domain D13. Finally, an overlapping part between the second alignment region E12 of the first alignment layer 310 and the fourth alignment region E24 of the second alignment layer 320 is the fourth domain D14, as described above in greater detail.

As a result, liquid crystal molecules 301 of the liquid crystal layer 300 are vertically aligned by the first alignment layer 310 and the second alignment layer 320, and pretilt in the respective first domain D11, second domain D12, third domain D13 and fourth domain D14 in different directions, e.g., the first pretilt direction A01, the second pretilt direction A02, the third pretilt direction A03 and the fourth pretilt direction A04. More specifically, the liquid crystal molecules 301 in the first domain D11 are aligned to pretilt in a sum direction of horizontal component directions of the first pretilt direction A31 and the third pretilt direction A43. The liquid crystal molecules 301 in the second domain D12 are aligned to pretilt in a sum direction of horizontal component directions of the first pretilt direction A31 and the fourth pretilt direction A44. The liquid crystal molecules 301 in the third domain D13 are aligned to pretilt in a sum direction of horizontal component directions of the second pretilt direction A32 and the third pretilt direction A43. The liquid crystal molecules 301 in the fourth domain D14 are aligned to pretilt in a sum direction of horizontal component directions among the second pretilt direction A32 and the fourth pretilt direction A44.

The first alignment layer 310 and the second alignment layer 320 are formed so that the first HCD A21, the second HCD A22, the third HCD A23 and the fourth HCD A24 of the liquid crystal molecules 301 vertically aligned by the fringe field F formed at the boundary of the pixel electrodes 180 in the respective domains are substantially equivalent to the first pretilt direction A01, the second pretilt direction A02, the third pretilt direction A03 and the fourth pretilt direction A04, respectively, of the liquid crystal molecules 301 by the first alignment layer 310 and the second alignment layer 320.

Thus, according to the manufacturing method according to an exemplary embodiment of the present as described above, the display device 901 having an improved viewing angle, enhanced display property and increased production efficiency is manufactured.

Since lying directions of the liquid crystal molecules 301 by the fringe field F formed at the boundary of the pixel electrodes 180 are substantially equivalent to the pretilt directions of the liquid crystal molecules 301 by the first alignment layer 310 and the second alignment layer 320, unnecessary collisions between the liquid crystal molecules 301 are minimized.

The first alignment layer 310 and the second alignment layer 320 vertically align the liquid crystal molecules 301 of the liquid crystal layer 300, and pretilt the liquid crystal molecules 301, thereby omitting a requirement for a separate means to pretilt the liquid crystal molecules 301 of the liquid crystal layer 300, e.g., by using a pattern on the common electrode 280, thereby omitting a requirement for forming the pattern thereon. Thus, a production process of the display device 901 is simplified.

The first alignment layer 310 and the second alignment layer 320 may be formed by two exposing processes using a mask. Thus, an additional process to pretilt the liquid crystal molecules 301 by the first alignment layer 310 and the second alignment layer 320 may be substantially reduced or effectively minimized.

A display device according to an alternative exemplary embodiment of the present invention will now be described in further detail with reference to FIG. 6. FIG. 6 is a plan view layout which illustrates alignment regions and pretilt directions formed on a first alignment layer 310 and a second alignment layer 320 in a display device 902 according to an alternative exemplary embodiment of the present invention. The same reference characters are used to designate the same or like components in FIG. 6, and repetitive descriptions thereof have therefore been omitted below.

As shown in FIG. 6, the first alignment layer 310 and the second alignment layer 320 include a first alignment region E31, a second alignment region E32, a third alignment region E33 and a fourth alignment region E34 which each have an associated pretilt direction Axx. The pretilt directions Axx are substantially equivalent to sum directions of horizontal component directions of a fringe field F (FIG. 2) formed at a boundary of pixel electrodes 180 in associated first domain D11, second domain D12, third domain D13 and fourth domain D14. More specifically, each of the first alignment layer 310 and the second alignment layer 320 have the first alignment region E31, the second alignment region E32, the third alignment region E33 and the fourth alignment region E34 which are in the first domain D11, the second domain D12, the third domain D13 and the fourth domain D14, respectively, included in a single domain group D10.

As a result, the display device 902 has an improved light transmittance and increased response time.

However, the first alignment layer 310 and the second alignment layer 320 may be formed through four separate exposing processes, thereby possibly lowering production efficiency. Therefore, alternative exemplary embodiments of the present invention are not limited to those described above.

For example, only one of the first alignment layer 310 and the second alignment layer 320 may pretilt vertically-aligned liquid crystal molecules 301. Put another way, only one of the first alignment layer 310 and the second alignment layer 320 may have pretilt directions in alternative exemplary embodiments of the present invention.

In addition, an alignment layer of the first alignment layer 310 and the second alignment layer 320 which does not have pretilt directions does not have horizontal component directions, either. Thus, only an alignment layer of the first alignment layer 310 and the second alignment layer 320 having the pretilt directions may pretilt the liquid crystal molecules 301.

Further, in this case the first domain D11, the second domain D12, the third domain D13 and the fourth domain D14 are divided only by the alignment layer having the pretilt directions.

Thus, the display device 902 has improved light transmittance while minimizing a decrease of production efficiency. However, a response speed of the display device 902 is lowered in this case.

Figure 7:
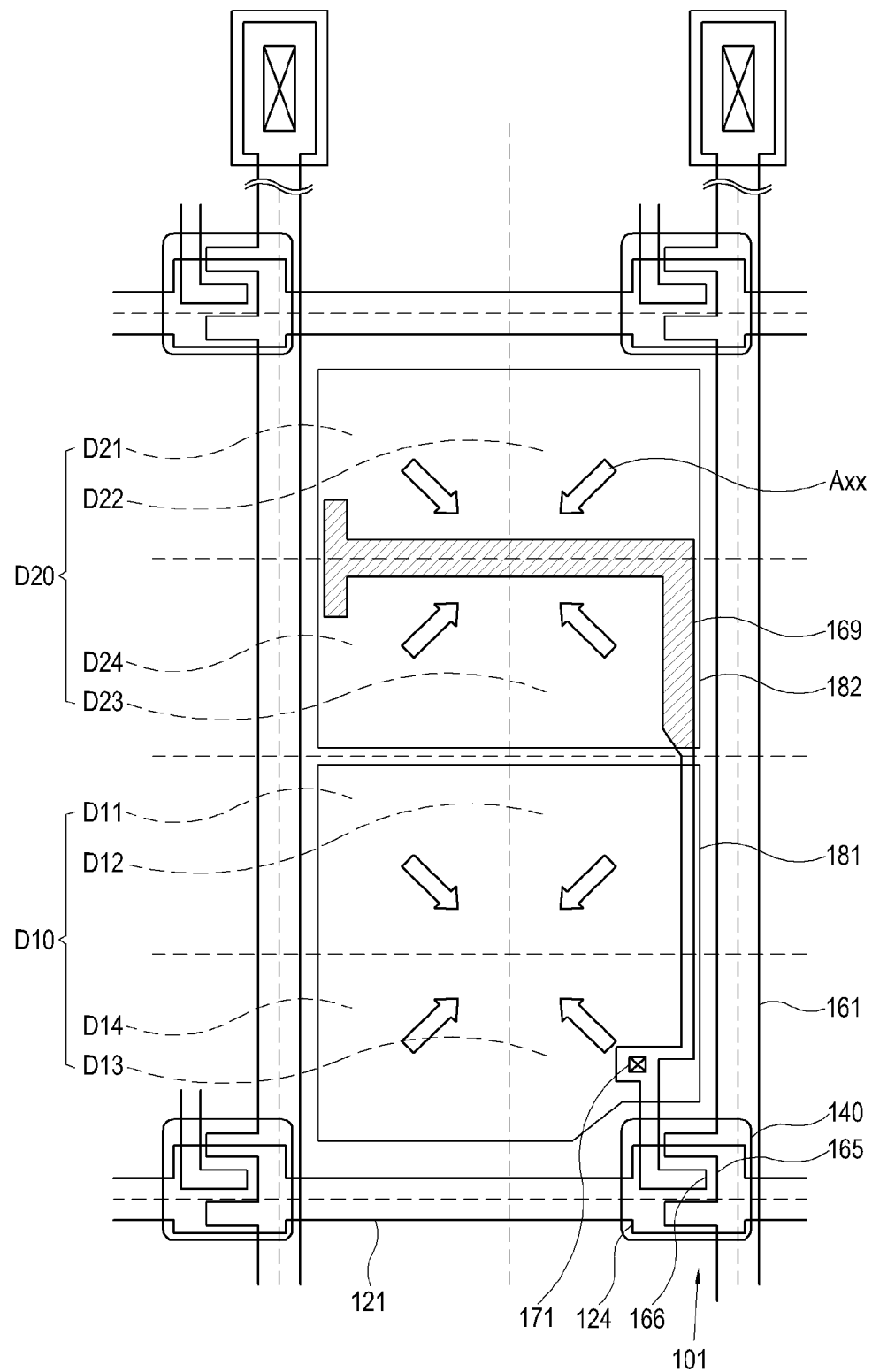
FIG. 7 is a plan view layout of a display device according to yet another alternative exemplary embodiment of the present invention.

A display device according to yet another alternative exemplary embodiment of the present invention will now be described with reference to FIGS. 1, 2 and 7. FIG. 7 is a plan view layout of a display device according to yet another alternative exemplary embodiment of the present invention. The same reference characters are used to designate the same or like components in FIGS. 1, 2 and 7, and repetitive descriptions thereof have therefore been omitted below.

As shown in FIG. 7, a first pixel electrode 181 and a second pixel electrode 182 are disposed in a single pixel, e.g., a single pixel area, of a display device 903. More specifically, the pixel includes at least one first pixel electrode 181 and at least one second pixel electrode 182.

The first pixel electrode 181 and the second pixel electrode 182 correspond to a first single domain group D10 and a second single D20, respectively. More specifically, the first domain group D10 corresponds to the first pixel electrode 181 while the second domain group D20 corresponds to the second pixel electrode 182, as shown in FIG. 7.

The first domain group D10 includes a first domain D11, a second domain D12, a third domain D13 and a fourth domain D14, while the second domain group D20 includes a fifth domain D21, a sixth domain D22, a seventh domain D23 and an eighth domain D24, all formed by a combination of alignment regions of the first alignment layer 310 and alignment regions of the second alignment layer 320.

More specifically, the first alignment layer 310 and the second alignment layer 320 have pretilt directions Axx such that sum directions of horizontal component directions of a fringe field F (FIG. 2) formed at a boundary of the first pixel electrode 180 and the second pixel electrode 190 in respective domains are substantially equivalent to sum directions of horizontal component directions of pretilt directions of the first alignment layer 310 and the second alignment layer 320. Thus, liquid crystal molecules 301 of a liquid crystal layer 300 pretilt in respective directions of arrows representing respective associated pretilt directions Axx in FIG. 7.

The pretilt directions Axx of the first alignment layer 310 and the second alignment layer 320 are substantially directed to a center of the first pixel electrode 181 and the second pixel electrode 182 from respective boundaries thereof, as illustrated in FIG. 7.

The first single domain group D10 and the second single domain group D20 each have four domains in which the liquid crystal molecules 301 pretilt in different directions. Thus, a total of eight domains, e.g., the first domain D11, the second domain D12, the third domain D13, the fourth domain D14, the fifth domain D21, the sixth domain D22, the seventh domain D23 and the eighth domain D24, having four kinds of pretilt directions exist in an exemplary embodiment of the present invention. Alternative exemplary embodiments of the present invention are not limited thereto, however. For example, the liquid crystal molecules 301 may tilt in different directions for each separate domain, e.g., to have eight kinds of pretilt directions in an alternative exemplary embodiment.

Further, FIG. 7 illustrates the first single domain group D10 and the second single domain group D20 which each have four domains, respectively, but alternative exemplary embodiments are not limited thereto. For example, two or more single domain groups may be included in alternative exemplary embodiments of the present invention.

Referring still to FIG. 7, a thin film transistor 101 is connected to the first pixel electrode 181 through a contact hole 171, and the thin film transistor 101 is connected to the second pixel electrode 182 through capacitive coupling, for example.

As a result, different data signals are applied to the first pixel electrode 181 and the second pixel electrode 182. More specifically, the first pixel electrode 181 receives a data signal through a drain electrode 166 of the thin film transistor 101. In contrast, the second pixel electrode 182 receives a capacitively-coupled data signal through a coupling capacitance $C_{CP}$ between an insulating layer (not shown) between the second pixel electrode 182 and an extension part 169 of the drain electrode 166, instead of receiving the data signal directly from the drain electrode 166 of the thin film transistor 101. Thus, the second pixel electrode 182 receives the capacitively-coupled data signal having a different level, e.g., a lower level, than a level of the data signal applied to the first pixel electrode 181 due to the coupling capacitance $C_{CP}$. As a result, a brightness of the first single domain group D10 corresponding to the first pixel electrode 181 is different from a brightness of the second domain group D20 corresponding to the second pixel electrode 182. More specifically, the capacitively-coupled data signal applied to the second pixel electrode 182 may have a voltage which is about 50% to about 90% of a voltage of the data signal applied to the first pixel electrode 181.

As a result, the brightness of the first domain group D10 is different from that of the second domain group D20, and the first domain group D10 and the second domain group D20 are substantially different from each other even if a respective pair of domains, e.g., the domain D11 of the first single domain group D10 and the domain D21 of the second single domain group D20, pretilt the liquid crystal molecules 301 in the same direction. As a result, a front brightness and/or color and a lateral brightness and/or color, for example, are compensated, thereby improving a lateral visibility, for example of the display device 903 according to an exemplary embodiment of the present invention.

Thus, the display device 903 according to an exemplary embodiment of the present invention has a substantially improved viewing angle and display property. Typical lying directions of the liquid crystal molecules 301 by the fringe field F formed at the boundary of the first pixel electrode 181 and the second pixel electrode 182 are substantially equivalent to respective pretilt directions of the liquid crystal molecules 301 by the first alignment layer 310 and the second alignment layer 320, thereby minimizing collisions between the liquid crystal molecules 301, as described above in greater detail.

Further, the first alignment layer 310 and the second alignment layer 320 vertically align the liquid crystal molecules 301 of the liquid crystal layer 300, and at the same time pretilt the liquid crystal molecules 301, thereby omitting a requirement for a means to pretilt the liquid crystal molecules 301 of the liquid crystal layer 300, e.g., by using a pattern on a common electrode 280, thereby omitting a need to form the pattern thereon. Thus, a production process of the display device 903 is effectively simplified.

Figure 8:
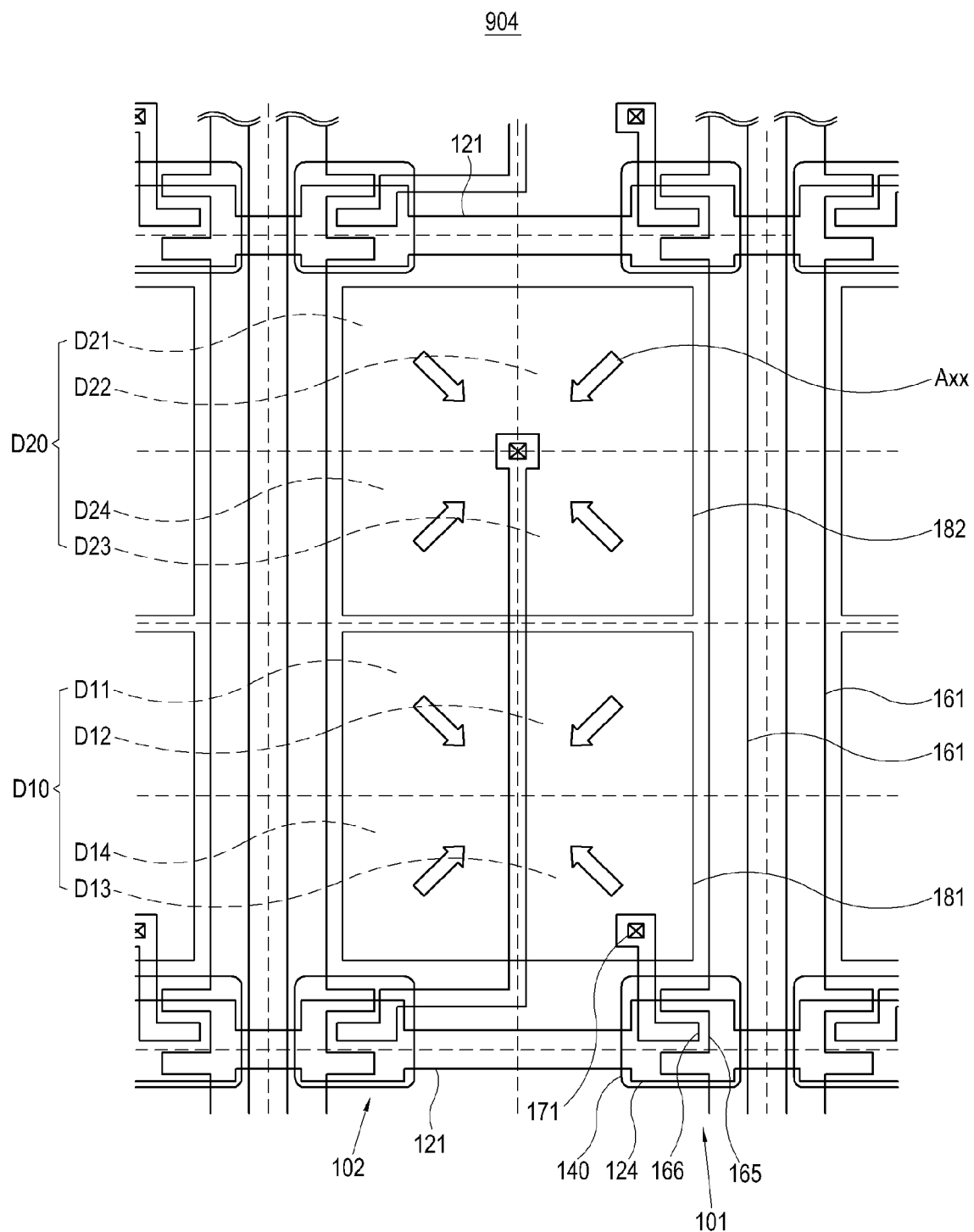
FIG. 8 is a plan view layout of a display device according to still another exemplary embodiment of the present invention.

A display device 904 according to still another exemplary embodiment of the present invention will now be described with reference to FIGS. 1, 2, 7 and 8. FIG. 8 is a plan view layout of a display device according to still another alternative exemplary embodiment of the present invention. The same reference characters are used to designate the same or like components in FIGS. 1, 2, 7 and 8, and repetitive descriptions thereof have therefore been omitted below.

As shown in FIG. 8, at least a first pixel electrode 181 and a second pixel electrode 182 are disposed in a single pixel, e.g., a single pixel area, of the display device 904. More specifically, the pixel includes at least one first pixel electrode 181 and at least one second pixel electrode 182.

The first pixel electrode 181 and the second pixel electrode 182 correspond to a first single domain group D10 and a second single domain group D20, respectively. More specifically, the first domain group D10 corresponds to the first pixel electrode 181 while the second domain group D20 corresponds to the second pixel electrode 182.

The domain group D10 includes a first domain D11, a second domain D12, a third domain D13 and a fourth domain D14, while the second domain group D20 includes a fifth domain D21, a sixth domain D22, a seventh domain D23 and an eighth domain D24, all formed by the combination of respective alignment regions of a first alignment layer 310 and corresponding alignment regions of a second alignment layer 320.

The first alignment layer 310 and the second alignment layer 320 have corresponding pretilt directions such that sum directions of horizontal component directions of a fringe field F (FIG. 2) formed at a boundary of the first pixel electrode 181 and the second pixel electrode 182 are substantially equivalent to sum directions of horizontal component directions of associated pretilt directions Axx of the first alignment layer 310 and the second alignment layer 320. Thus, liquid crystal molecules 301 of a liquid crystal layer 300 pretilt in respective pretilt directions Axx as indicated by corresponding arrows in FIG. 8.

The pretilt directions Axx of the first alignment layer 310 and the second alignment layer 320 are substantially directed toward a center of the first pixel electrode 181 and the second pixel electrode 182 from respective boundaries thereof.

The first single domain group D10 and the second single domain group D20 each have four kinds of domains in which the liquid crystal molecules 301 pretilt in different directions. Thus, a total of eight domains, e.g., the first domain D11, the second domain D12, the third domain D13, the fourth domain D14, the fifth domain D21, the sixth domain D22, the seventh domain D23 and the eighth domain D24, having four kinds of pretilt directions exist, but alternative exemplary embodiments of the present invention are not limited thereto. For example, the liquid crystal molecules 301 may tilt in different directions for each individual domain, e.g., the first domain D11, the second domain D12, the third domain D13, the fourth domain D14, the fifth domain D21, the sixth domain D22, the seventh domain D23 and the eighth domain D24, such that there are eight pretilt directions.

Further, FIG. 8 illustrates the first single domain group D10 and the second single domain group D20 which have four domains, respectively, but alternative exemplary embodiments are not limited thereto. Alternatively, each of the respective first single domain group D10 and the second single domain group D20 may include two or more domains.

Referring still to FIG. 8, the display device 904 includes a first thin film transistor 101 connected to the first pixel electrode 181 and a second thin film transistor 102 connected to the second pixel electrode 182. The first thin film transistor 101 and the second thin film transistor 102 are connected to different individual data lines 161 of a plurality of data lines 161. More specifically, the first pixel electrode 181 and the second pixel electrode 182 may receive different data signals through the first thin film transistor 101 and the second thin film transistor 102, respectively.

Thus, a brightness of the first domain group D10 corresponding to the first pixel electrode 181 may be different from a brightness of the second domain group D20 corresponding to the second pixel electrode 182.

Since the brightness of the first domain group D10 is different from that of the second domain group D20, the domains are substantially different from each other even when a pair of a single domains of the first domain group D10 and the second domain group D20, e.g., the domain D13 of the first single domain group D10 and the domain D23 of the second single domain group D20, pretilt the liquid crystal molecules 301 in a substantially similar direction. Thus, a plurality of different domains exists in a single pixel. Therefore, a front and a lateral brightness and/or color are effectively compensated, thereby improving a lateral visibility, for example, of the display device 904 according to an exemplary embodiment of the present invention.

Therefore, the display device 904 has an improved viewing angle and display property.

Typical lying directions of the liquid crystal molecules 301 by the fringe field F formed at the boundary of the first pixel electrode 181 and the second pixel electrode 182 are substantially equivalent to pretilt directions of the liquid crystal molecules 301 by the first alignment layer 310 and the second alignment layer 320, thereby minimizing collisions between the liquid crystal molecules 301.

Thus, the first alignment layer 310 and the second alignment layer 320 vertically align the liquid crystal molecules 301 of the liquid crystal layer 300, and at the same time pretilt the liquid crystal molecules 301, thereby omitting a requirement for a means to pretilt the liquid crystal molecules 301 of the liquid crystal layer 300, e.g., by using a pattern on the common electrode 280, thereby omitting a need for forming the pattern thereon. Thus, a production process of the display device 904 is substantially simplified.

Figure 9:
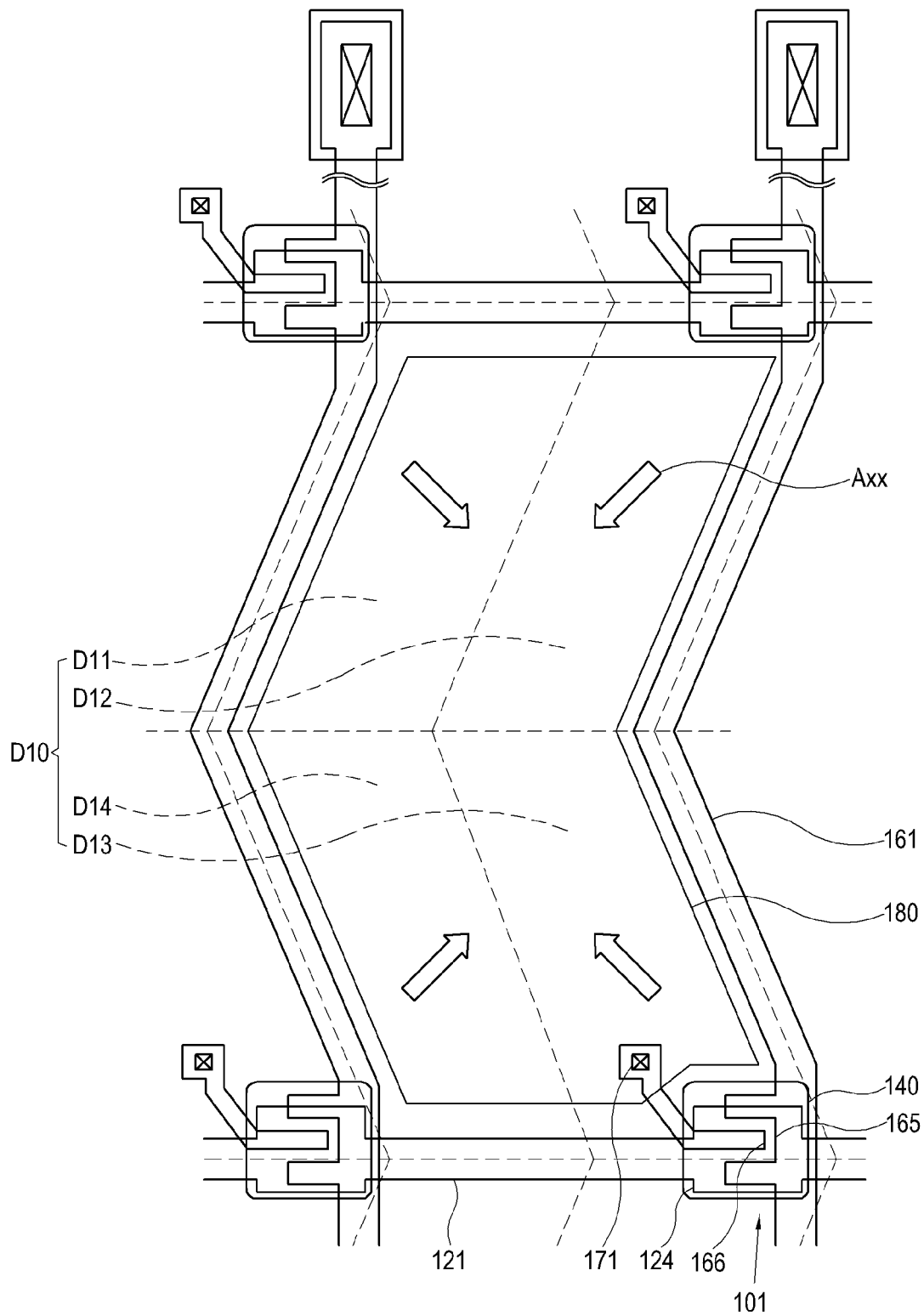
FIG. 9 is a plan view layout of a display device according to another exemplary embodiment of the present invention.

A display device according to another exemplary embodiment of the present invention will now be described in further detail with reference to FIGS. 1, 2 and 9. FIG. 9 is a plan view layout of a display device according to another alternative exemplary embodiment of the present invention. The same reference characters are used to designate the same or like components in FIGS. 1, 2, and 9, and repetitive descriptions thereof have therefore been omitted below.

As shown in FIG. 9, a pixel electrode 180 of a display device 905 has sides formed in an angular direction. More specifically, interior lateral corners of the pixel electrode 180 have either an acute angle or an obtuse angle, e.g., the interior corners of the pixel electrode 180 are not right angles, in contrast to exemplary embodiments of the present invention discussed in greater detail above with respect to FIGS. 1-8. Further, at least one of a gate line 121 and a data line 161 formed in a first panel 100 has an angular portion bent in a substantially zigzag pattern. For example, referring to FIG. 9, it can be seen that gate lines 121 extend in a first substantially row direction and adjacent gate lines 121 are substantially parallel to each other. In contrast, data lines 161 extend generally in a second direction substantially perpendicular to the first direction at intersections of the data lines 161 with the gate lines 121, but at least one of the data lines 161 deviates from the second direction and extends in an angular direction between adjacent intersections of the of the data lines 161 with the gate lines 121.

Still referring to FIG. 9, respective sides of the pixel electrode 180 formed in a given angular direction are parallel to the associated angular portion. It will be noted that while FIG. 9 illustrates the data lines 161 having angular portions, alternative exemplary embodiments of the present invention are not limited thereto. For example, a lateral side of the pixel electrode 180 in a longitudinal direction may be formed in an angular direction while the gate line 121 and the data line 161 do not have angular portions.

Further, the pixel electrode 180 in alternative exemplary embodiments may have various other shapes such as a chevron shape, a "Z" shape or a double "Z" shape, for example, but is not limited thereto.

An angular side of the pixel electrode 180, as described above in reference to FIG. 9, forms a preset angle with a polarizing axis of a polarizing plate (not shown) attached to the first panel 100 and the second panel 200, thereby substantially improving a viewing angle of the display device 905 and effectively minimizing waste of the polarizing plate in a production process, thereby substantially reducing a production cost thereof.

Still referring to FIG. 9, the first alignment layer 310 and the second alignment layer 320 divide the pixel electrode 180 into a first domain D11, a second domain D12, a third domain D13, and a fourth domain D14. More specifically, the first domain D11, the second domain D12, the third domain D13, and the fourth domain D14 may be formed by combined alignment regions of the first alignment layer 310 and corresponding alignment regions of the second alignment layer 320, as described above in greater detail.

The first alignment layer 310 and the second alignment layer 320 have pretilt directions such that sum directions of horizontal component directions of a fringe field F (FIG. 2) formed at a boundary of the pixel electrodes 180 in respective domains, e.g., the first domain D11, the second domain D12, the third domain D13, and the fourth domain D14, are substantially equivalent to sum directions of horizontal component directions of pretilt directions Axx of the first alignment layer 310 and the second alignment layer 320, as indicated by arrows corresponding to respective pretilt directions Axx in FIG. 9.

Therefore, the display device 905 has an improved viewing angle and display property. Typical lying directions of the liquid crystal molecules 301 by the fringe field F formed at the boundary of the pixel electrodes 180 are substantially equivalent to the pretilt directions Axx of the liquid crystal molecules 301 by the first alignment layer 310 and the second alignment layer 320, thereby minimizing collisions between the liquid crystal molecules 301.

Further, the first alignment layer 310 and the second alignment layer 320 vertically align the liquid crystal molecules 301 of the liquid crystal layer 300, and at the same time pretilt the liquid crystal molecules 301, thereby eliminating a requirement for a means to pretilt the liquid crystal molecules 301 of the liquid crystal layer 300, e.g., by using a pattern on the common electrode 280, thereby omitting a need to form the pattern thereon. Thus, a production process of the display device 905 is simplified.

The first domain D11, the second domain D12, the third domain D13, and the fourth domain D14 which pretilt the liquid crystal molecules 301 in different directions are combined into a single domain group D10. FIG. 9 illustrates the first domain D11, the second domain D12, the third domain D13, and the fourth domain D14 which correspond to the single pixel electrode 180 and form the single domain group D10, but alternative exemplary embodiments of the present invention are not limited thereto. For example, a plurality of domain groups D10 may be formed corresponding to the single pixel electrode 180.

In summary, as described above in greater detail, exemplary embodiment of the present invention include a display device having an improved viewing angle, an enhanced display property and increased production efficiency.

More specifically, typical lying directions of liquid crystal molecules by a fringe field formed in a fringe area of pixel electrodes are substantially equivalent to pretilt directions of the liquid crystal molecules by a first alignment layer and a second alignment layer, thereby minimizing collisions between adjacent liquid crystal molecules thereby reducing formation of a texture, e.g., a dark area, in the display device.

Further, since the liquid crystal molecules are pretilted by the first alignment layer and the second alignment layer, a pattern to pretilt the liquid crystal molecules is not required on a common electrode. Thus, a production process of the display device is simplified, since the first alignment layer and the second alignment layer vertically align the liquid crystal molecules of the liquid crystal layer, and at the same time pretilt the liquid crystal molecules.

The first alignment layer and the second alignment layer may be formed by an exposing process using a mask. Thus, an additional process for pretilting the liquid crystal molecules is effectively eliminated.

According to exemplary embodiments of the present invention as described herein, a display device has advantages which include, but are not limited to, improved viewing angle, improved display property and increased manufacturing efficiency.

However, the present invention should not be construed as being limited to the exemplary embodiments set forth herein. Rather, these exemplary embodiments are provided so that this disclosure will be thorough and complete and will fully convey the concept of the present invention to those skilled in the art.

For example, while a display panel which employs an amorphous silicon thin film transistor formed by a five mask process has been described herein, alternative exemplary embodiments of the present invention are not limited thereto.

Further, a vertically aligned liquid crystal display panel in which a single pixel is the smallest unit of displaying an image and is divided into a plurality of domains has been described herein, but alternative exemplary embodiments of the present invention are not limited thereto.

While the present invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:

1. A display device, comprising:
a first panel having a pixel electrode, the pixel electrode includes a first sub-pixel electrode and a second sub-pixel electrode;
a second panel facing the first panel and having a common electrode;
a liquid crystal layer interposed between the first panel and the second panel, the liquid crystal layer having vertically-aligned liquid crystal molecules;
a first alignment layer disposed on the pixel electrode;
a second alignment layer disposed on the common electrode;
a thin film transistor having a drain electrode which is connected to the first pixel electrode;
an extension portion is extended from the drain electrode,
wherein at least one of the first alignment layer and the second alignment layer
divides the pixel electrode into a plurality of domains,
is formed to have a plurality of pretilt directions, each pretilt direction of the plurality of pretilt directions defines a domain of each of the plurality of domains of the pixel electrode, and
pretilts the vertically-aligned liquid crystal molecules in the domain according to the corresponding pretilt direction of the domain
wherein a sum of horizontal component directions of the corresponding pretilt direction of the domain of the first alignment layer and the second alignment layer is substantially directed to a center of the pixel electrode from a peripheral boundary thereof, and
wherein a width of the extension portion aligned with the second sub-pixel electrode is wider than a width of the extension portion aligned with the first sub-pixel electrode.

2. The display device according to claim 1, wherein the pretilt direction of the at least one of the first alignment layer and the second alignment layer is directed from a peripheral region of the pixel electrode to a center region thereof.

3. The display device according to claim 1, wherein the pretilt direction of the liquid crystal molecules is substantially equivalent to a sum of horizontal component directions of the pretilt direction of the at least one of the first alignment layer and the second alignment layer.

4. The display device according to claim 3, wherein the first alignment layer and the second alignment layer each comprise two or more alignment regions having different pretilt directions, and
domains of the plurality of domains of the pixel electrode are determined by respective combinations of alignment regions of the first alignment layer and the second alignment layer, respectively.

5. The display device according to claim 4, wherein the different pretilt directions of the two or more alignment regions of the first alignment layer are aligned toward each other,
the different pretilt directions of the two or more alignment regions of the second alignment layer are aligned toward each other, and
the different pretilt directions of the first alignment layer are aligned substantially perpendicular to the different pretilt directions of the second alignment layer.

6. The display device according to claim 1, wherein
at least one of the first alignment layer and the second alignment layer form four or more domains of the plurality of domains in which the vertically-aligned liquid crystal molecules are pretilted in different directions, the four or more domains form a single domain group, and the single domain group corresponds to the pixel electrode.

7. The display device according to claim 1, wherein a first side of the pixel electrode is formed at one of an obtuse angle and an acute angle with respect to an adjacent second side of the pixel electrode.

8. The display device according to claim 7, wherein the first side of the pixel electrode comprises at least one bent part.

9. A display device, comprising:
a first panel comprising:
a thin film transistor;
a first pixel electrode connected to the thin film transistor; and
a second pixel electrode connected to the thin film transistor through a coupling capacitor;
a second panel facing the first panel and having a common electrode;
a liquid crystal layer interposed between the first panel and the second panel, the liquid crystal layer having vertically-aligned liquid crystal molecules;
a first alignment layer disposed on the first pixel electrode and the second pixel electrode; and
a second alignment layer disposed on the common electrode,
wherein at least one of the first alignment layer and the second alignment layer
divides at least one of the first pixel electrode and the second pixel electrode into a plurality of domains,
is formed to have a plurality of pretilt directions, each pretilt direction of the plurality of pretilt directions defines a domain of each of the plurality of domains of the at least one of the first pixel electrode and the second pixel electrode, and
pretilts the vertically-aligned liquid crystal molecules in the domain according to the corresponding pretilt direction of the domain,
wherein a sum of horizontal component directions of the corresponding pretilt direction of the domain of the first alignment layer and the second alignment layer is substantially directed to a center of the pixel electrode from a peripheral boundary thereof, and
wherein a width of the coupling capacitor aligned with the second sub-pixel electrode is wider than a width of the coupling capacitor aligned with the first sub-pixel electrode.

10. The display device according to claim 9, wherein the pretilt direction of the at least one of the first alignment layer and the second alignment layer is directed from a peripheral region of the at least one of the first pixel electrode and the second pixel electrode to a center region thereof.

11. The display device according to claim 9, wherein the pretilt direction of the liquid crystal molecules is substantially equivalent to a sum of horizontal component directions of the pretilt direction of the at least one of the first alignment layer and the second alignment layer.

12. The display device according to claim 11, wherein the first alignment layer and the second alignment layer each comprise two or more alignment regions having different pretilt directions, and
domains of the plurality of domains of the pixel electrode are determined by respective combinations of alignment regions of the first alignment layer and the second alignment layer, respectively.

13. The display device according to claim 12, wherein
the different pretilt directions of the two or more alignment regions of the first alignment layer are aligned toward other,
the different pretilt directions of the two or more alignment regions of the second alignment layer are aligned toward each other, and
the different pretilt directions of the first alignment layer are aligned substantially perpendicular to the different pretilt directions of the second alignment layer.

14. The display device according to claim 9, wherein
at least one of the first alignment layer and the second alignment layer forms four or more domains of the plurality of domains in which the vertically-aligned liquid crystal molecules are pretilted in different directions,
the four or more domains form a single domain group, and
the single domain group corresponds to the at least one of the first pixel electrode and the second pixel electrode.

15. A method of manufacturing a display device, the method comprising:
forming a first panel having a pixel electrode, the pixel electrode includes a first sub-pixel electrode and a second sub-pixel electrode;
forming a thin film transistor having a drain electrode connected to the first pixel electrode;
forming an extension portion extended from the drain electrode, the extension portion having a width of the extension portion aligned with the second sub-pixel electrode is wider than a width of the extension portion aligned with the first sub-pixel electrode;
forming a second panel facing the first panel and having a common electrode;
forming a first alignment layer on the first panel;
forming a second alignment layer on the second panel;
interposing a liquid crystal layer having vertically-aligned liquid crystal molecules between the first alignment layer and the second alignment layer;
dividing the pixel electrode into a plurality of domains using at least one of the first alignment layer and the second alignment layer; and
pretilting the vertically-aligned liquid crystal molecules using a pretilt direction of the at least one of the first alignment layer and the second alignment layer defining a domain of each of the plurality of domains of the pixel electrode such that a sum of horizontal component directions of the pretilt direction of the domain of the first alignment layer and the second alignment layer is substantially directed to a center of the pixel electrode from the peripheral boundary of the pixel electrode.

16. The method according to claim 15, wherein the pretilting the vertically-aligned liquid crystal molecules using the pretilt direction of the at least one of the first alignment layer and the second alignment layer comprises using a photo alignment method including an exposing process using a mask.

17. A display device, comprising:
a first substrate having a pixel electrode, the pixel electrode includes a first sub-pixel electrode and a second sub-pixel electrode;
a second substrate facing the first substrate;
a first alignment layer and a second alignment layer on the substrates;
a liquid crystal layer formed between the substrates and pretilted by a tilted UV light exposing;
a gate line extended in a first direction;
a data line extended in a second direction;
each sub-pixel electrode having a shape of substantial rectangle and four domains;
a thin film transistor having a drain electrode which is connected to the first pixel electrode through a contact hole;

an extension portion is extended from the drain electrode;
a vertical domain boundary line and a horizontal domain boundary line intersecting each other in the pixel electrode,
wherein, the extension portion is disposed at the vertical domain boundary line, and a width of the pixel electrode is wider than a width of the extension portion along the first direction, and
wherein a width of the extension portion aligned with the second sub-pixel electrode is wider than a width of the extension portion aligned with the first sub-pixel electrode.

18. The display device of claim 17, further comprising a first thin film transistor having a first drain electrode which is connected to the first sub-pixel electrode through a first contact hole and a second thin film transistor having a second drain electrode which is connected to the second sub-pixel electrode through a second contact hole.

19. The display device of claim 18, wherein at least one of the first contact hole or the second contact hole is disposed at a center of the sub-pixel electrode.

20. The display device of claim 19, wherein the domains are determined respectively by respective combinations of alignment regions of the first alignment layer and the second alignment layer and a pretilt direction of the first alignment layer is aligned substantially perpendicular to a pretilt direction of the second alignment layer.

21. The display device of claim 17, wherein the contact hole is disposed at a center of the pixel electrode.

22. The display device of claim 21, wherein the domains are determined respectively by respective combinations of alignment regions of the first alignment layer and the second alignment layer and a pretilt direction of the first alignment layer is aligned substantially perpendicular to a pretilt direction of the second alignment layer.

23. The display device of claim 17, wherein the domains are determined respectively by respective combinations of alignment regions of the first alignment layer and the second alignment layer and a pretilt direction of the first alignment layer is aligned substantially perpendicular to a pretilt direction of the second alignment layer.

24. The display device of claim 23, wherein the contact hole is disposed at a center of the pixel electrode.

* * * * *